United States Patent
Black et al.

(10) Patent No.: US 12,147,664 B2
(45) Date of Patent: Nov. 19, 2024

(54) AUTOMATED APPLICATION DETECTION AND STORAGE SAVINGS BASED ON INTELLIGENT WORKLOAD CHARACTERIZATION

(71) Applicant: NetApp, Inc., San Jose, CA (US)

(72) Inventors: Nathanael Black, Raleigh, NC (US); Ashwin Palani, Apex, NC (US); Jeffrey MacFarland, Wake Forest, NC (US)

(73) Assignee: NETAPP, INC., San Jose, CA (US)

( * ) Notice: Subject to any disclaimer, the term of this patent is extended or adjusted under 35 U.S.C. 154(b) by 14 days.

(21) Appl. No.: 18/146,230

(22) Filed: Dec. 23, 2022

(65) Prior Publication Data
US 2024/0211129 A1  Jun. 27, 2024

(51) Int. Cl.
*G06F 3/06* (2006.01)
*G06F 11/34* (2006.01)

(52) U.S. Cl.
CPC .......... *G06F 3/0604* (2013.01); *G06F 3/0631* (2013.01); *G06F 3/0673* (2013.01); *G06F 11/3409* (2013.01)

(58) Field of Classification Search
CPC .... G06F 3/0604; G06F 3/0673; G06F 3/0631; G06F 11/3409
See application file for complete search history.

(56) References Cited

U.S. PATENT DOCUMENTS

| | | | | |
|---|---|---|---|---|
| 10,795,583 | B2* | 10/2020 | Yang | G06F 3/0605 |
| 2009/0198946 | A1* | 8/2009 | Ebata | G06F 3/067 |
| | | | | 711/E12.001 |
| 2016/0062754 | A1* | 3/2016 | Tripp | G06F 9/5055 |
| | | | | 717/120 |
| 2022/0156661 | A1* | 5/2022 | Xu | H04L 41/0826 |
| 2022/0308981 | A1* | 9/2022 | Zeigen | G06N 20/00 |
| 2023/0161634 | A1* | 5/2023 | Draznin | G06F 9/5055 |
| | | | | 718/104 |
| 2023/0418489 | A1* | 12/2023 | Chen | G06F 3/0689 |

* cited by examiner

*Primary Examiner* — Mark A Giardino, Jr.
(74) *Attorney, Agent, or Firm* — Amin, Turocy & Watson, LLP

(57) ABSTRACT

A system can comprise a memory that stores computer executable components, and a processor that executes the computer executable components stored in the memory. The computer executable components can comprise a correlation component that, based on performance data, such as current performance data and/or historical performance data, for an application stored at a storage system, correlates a performance category with the application, and an execution component that, based on the performance category correlated to the application, executes a modification at the storage system, wherein the modification at the storage system comprises changing a functioning of the storage system relative to the application. In an embodiment, the data comprised by the application can be maintained in a non-accessed state to execute the modification at the storage system.

20 Claims, 10 Drawing Sheets

AUTOMATED APPLICATION DETECTION AND STORAGE SAVINGS BASED ON INTELLIGENT WORKLOAD CHARACTERIZATION

TECHNICAL FIELD

The subject disclosure relates generally to storage system performance and efficiency, and more specifically to automatic storage system savings of performance and efficiency based on intelligent workload characterization through evaluation of applications stored at the storage system.

BACKGROUND

Storage system performance and efficiency can be directly related to the applications stored at the storage system and to the use of such applications for the conducting of workloads. Yet, storage systems do not comprise the awareness and or capacity to act on typing and/or use of such applications, which can number in the millions, to better provide such performance and/or efficiency.

SUMMARY

The following presents a summary to provide a basic understanding of one or more embodiments described herein. This summary is not intended to identify key or critical elements, delineate scope of embodiments or scope of claims. Its sole purpose is to present concepts in a simplified form as a prelude to the more detailed description that is presented later. In one or more embodiments described herein, systems, computer-implemented methods, apparatuses, and/or computer program products can facilitate a process to automatically determine and execute a modification at a storage system to achieve improved performance, capacity and/or efficiency of the storage system.

In accordance with an embodiment, a system can comprise a memory that stores computer executable components, and a processor that executes the computer executable components stored in the memory. The computer executable components can comprise a correlation component that, based on performance data for an application stored at a storage system, correlates a performance category with the application, and an execution component that, based on the performance category correlated to the application, executes a modification at the storage system, wherein the modification at the storage system comprises changing a functioning of the storage system relative to the application.

In accordance with another embodiment, a computer-implemented method can comprise correlating, by a processor, based on performance data resulting from non-intrusive collection of the performance data for an application stored at a storage system, a performance category with the application, and executing, by the processor, based on the performance category, a directing of resources at the storage system that alters use of the application by a device accessing the storage system.

In accordance with yet another embodiment, a computer program product can facilitate an automated process to determine and apply a modification at a storage system. The computer program product can comprise program instructions executable by a processor to cause the processor to execute operations. The operations can comprise grouping, by the processor, based on performance data for an application stored at the storage system, the application or a data object employed by the application in a group with a second application at the storage system, wherein the group is defined by a common performance category of the application and of the second application, and executing, by the processor, based on the common performance category, the modification at the storage system, wherein the modification at the storage system comprises changing a functioning of the storage system relative to the group.

In an embodiment of the one or more of the above-indicated method, system and/or non-transitory computer-readable medium, data comprised by the application can be maintained in a non-accessed state to execute the modification at the storage system. An advantage of this embodiment can be maintaining non-access to data of the applications, such as all data of the applications. Indeed, in one or more cases, no right to access the actual applications has been provided.

An advantage of one or more of the above-indicated method, system and/or non-transitory computer-readable medium can be dynamically adjustable storage system application movement and/or policy generation, such as based on one or more changes in performance data and/or workload characterization for one or more applications stored at the storage system. As a result, workload performance using the storage system can be improved, such as related to latency and operations.

As used herein, a data object can refer to a volume, file, data block, storage container, LUN and/or S3 object, such as employed by an application.

As used herein, a workload can refer to one or more different types of file, LUN, application, namespace, etc. workloads that can be imposed on a system by one or more external client entities.

Another advantage of one or more of the above-indicated method, system and/or non-transitory computer-readable medium can be setting of dynamically adjustable thresholds for performance or efficiency at the storage system upon which the dynamic adjustment can be executed. That is, as opposed to defined static thresholds (e.g., high, medium, and low), full variation of thresholds can be employed. Likewise, grouping of the application based on performance metrics also can be dynamically adjustable, as opposed to use of defined static ranks (e.g., high, medium, and low). Accordingly, greater correspondence to a desired effect can be achieved relative to one or more modifications comprising changing a functioning of the storage system.

As used herein, "performance" can refer to lack of latency, resource usage and/or resource utilization. As used herein, "capacity" can refer to storage capacity, remaining capacity, efficient use of capacity and/or capacity savings. As used herein, "efficiency" can refer to decreased latency, increased resource usage and/or increased resource utilization.

Yet another advantage of one or more of the above-indicated method, system and/or non-transitory computer-readable medium can be lack of reliance on human intervention for the execution of one or more modifications at the storage system.

Another advantage of any one or more of the aforementioned system, computer program product and/or computer-implemented method can be self-improvement of the system such as by continually training analytical models employed by the system, at a suitable frequency. The analytical models can be employed generate the correlations, groupings and/or change determinations to be implemented at the storage system to achieve the aforementioned storage system increase in performance and/or efficiency. Due to the updating, subsequent iterations of use of the one or more of the aforementioned system, computer program product and/or computer-implemented method can be made more accurate and/or efficient.

In one or more embodiments, the analytical models can be updated based on realtime data determined after a modification execution. The update can be performed based on one or more aspects of performance data, issue occurrences, new hardware and/or new software upon which the analytical model has not previously been trained. Due to such updating, subsequent iterations of use of the system can be made more accurate and/or efficient.

DETAILED DESCRIPTION

Figure 1:
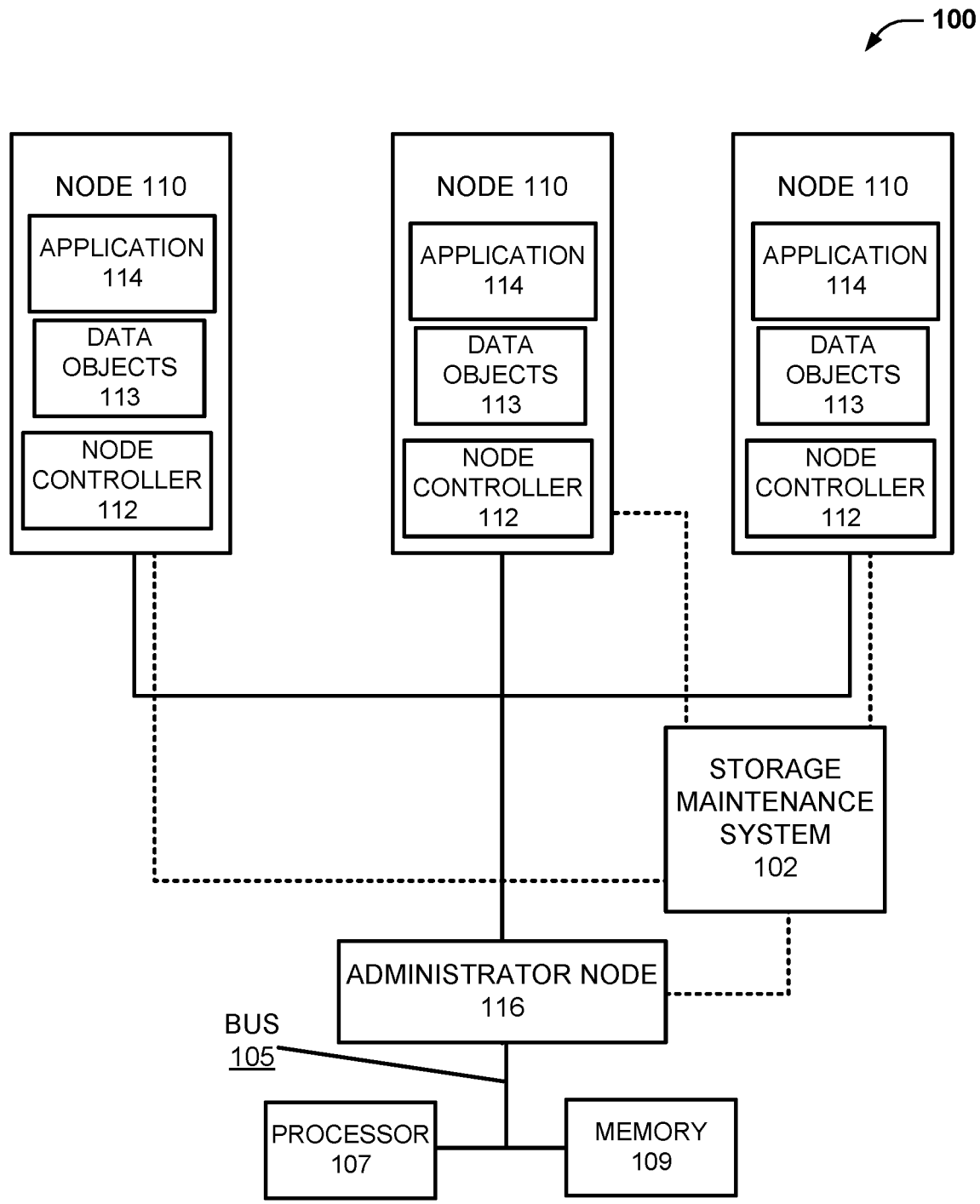
FIG. 1 illustrates a block diagram illustrating an example of various components of a storage system, in accordance with one or more embodiments and/or implementations described herein.

The technology described herein is generally directed towards determining one or more modifications at a storage system, such as allocation of one or more applications and/or data objects employed by applications and/or generation of one or more policies affecting use of the one or more applications, and more particularly to determining such modifications based on current performance data, historical performance data and/or workload characterization data for the one or more applications.

In one or more existing frameworks, due to changes in workload, data at a storage unit (e.g., volume, aggregate or node) of a storage system, hardware, software and/or other modifications at a storage system, storage system performance and/or efficiency can dynamically vary over time. In one or more existing frameworks, such varying can be addressed by policy generation and/or by one or more arrangements of applications and/or data objects (e.g., files, volumes and/or data blocks) employed by such applications. Such arrangement can refer to a move, copy and/or de-duplication.

However, implementation of such one or more arrangements and/or policy generations can be applied intermittently and/or reactively. That is, failure to address and/or predict issues in storage system efficiency and/or performance can lead to latency, functionality, performance, lockup and/or other issues of a respective storage system. These issues can result in service interruption such as reduction of input output (I/O), complete stoppage of I/O to client workloads, and/or failure to meet an agreement with respect to workload latency. One or more other negative results that can result due to such issues can comprise an aggregate and/or a volume being taken offline.

For example, consider that voluminous amounts of applications and/or data objects can be stored at a single volume, aggregate, node, and/or cluster by various different devices (e.g., computers, servers and/or machines). The various different devices can be associated with various different entities. That is, the applications and/or data objects can have varying schemes for organization, classification and/or labeling, and/or can lack any such aspects. Accordingly, it can be the case that duplicates of applications and/or data objects can be at a same storage system, like applications and/or data objects can be spread across nodes instead of better consolidated, applications and/or data objects employed for a same workload or common workloads can be spread across nodes instead of consolidated at a single node, applications and/or data objects that are less often used can have higher priority access than applications and/or data objects that are more often used, and/or workloads have changed but priority of applications and/or data objects at the storage system have not been correspondingly updated.

Accordingly, consider that a storage cluster of twenty nodes can have individual and duplicated copies of an operating system that are stored on hundreds of volumes and different storage aggregates. Identifying the operating system applications and co-locating such applications could save substantial storage space, such as at least partially in parallel with de-duplication of one or more applications and/or data objects. Further, in one or more cases, having plural instances of a same application running on a same storage system can cause compatibility issues and/or performance overload. Accordingly, co-locating and/or de-duplication can address these issues.

Yet in existing frameworks, due to storage operations (e.g., writes) performed by varying user entities, no uniform system of labeling, classification and/or description is employed for the numerous applications and/or data objects stored at a same storage system by these varying user entities. As a result, any one or more of the aforementioned issues can occur without notice for an administrator entity of the storage system or for a user entity of the storage system, thus causing inability and/or decrease in ability to use the storage system to its highest efficiency and potential.

To account for one or more of the aforementioned deficiencies with existing frameworks for maintenance of applications at a storage system, one or more embodiments herein can provide a framework for automatically performing maintenance at a storage system relative to the numerous applications and/or data objects employed by the applications. Generally, a system, computer-implemented method and/or computer program product described herein can discover an application's storage components so that the underlying storage services can be optimized. This can include discovering related workloads. Optimizations can be employed based on the discovered information allowing for an intelligent and application-aware storage system feature that can simplify storage management. Savings through deduplication, automatic application of QoS policies, automatic load balancing and/or replication can be just some of the benefits of such feature.

Put another way, a system, computer-implemented method and/or computer program product described herein can determine and implement a modification at a storage system relative to one or more applications stored at the storage system. More particularly, a system, computer-implemented method and/or computer program product described herein can dynamically determine and execute one or more modifications at a storage system to account for the varying types of applications stored at the storage system, the manner and/or location of storage of the applications at the storage system, the various differing uses of the applications, the various different and dynamically changing workloads employing the applications (and thus also employing the storage system).

At one or more embodiments discussed herein, generally, current performance data and/or historical performance data can be monitored and obtained. Performance data for the one or more applications can be determined. One or more performance categories can be correlated to one or more applications. One or more applications can be evaluated, and a prediction generated as to a type and/or use of the one or more applications. One or more applications can be grouped and/or excluded based on the one or more correlations and/or predictions. One or more thresholds can be generated based on the performance data monitored and obtained.

One or more determinations of possible modification at the storage system can be generated based on the performance data obtained and monitored. One or more change determinations can be generated for maintaining performance and/or efficiency of the storage system based on the one or more correlations, one or more predictions, grouping and/or excluding, one or more change determinations, and/or one or more thresholds. One or more executions of one or more modifications, based on the one or more change determinations, can be executed at the storage system. The one or more modifications can be to (e.g., can comprise) a functioning of the storage system.

The modification in functioning of the storage system can be that a different aggregate and/or node can be used to access an application that has been moved, that a read/write/get can refer to a different aggregate and/or node due to the application move, that similar applications can be stored together, that one or more applications can be de-duplicated, and/or that one or more workloads, nodes, aggregates, volumes and/or the storage system can operate with increased efficiency (e.g., reduction in latency, availability of increase in resource usage and/or availability of increase in resource utilization), capacity (e.g., storage capacity, remaining capacity, efficient use of capacity and/or capacity savings) and/or performance (e.g., lack of latency, resource usage and/or resource utilization).

The dynamically adjustable maintenance processes above can employ dynamic grouping of applications. That is, such grouping can be fully adjustable, rather than being limited to any defined and/or static groupings related only to defined categories. It is appreciated that the grouping can be in function alone, rather than physical grouping of applications together at a volume, aggregate and/or node. That is, the grouping can comprise listing, logging and/or associating of applications with one another by one or more embodiments described herein.

During one or more of the processes listed above, data comprised by the one or more applications evaluated and/or of interest can be maintained in a non-accessed state. That is, the applications can be analyzed, such via analyzing behavior of the applications, actions caused by the applications, and/or changes resulting from execution of the applications without direct access to data comprised by the applications. Thus, respective states of non-access/non-intrusion to data of the applications are not compromised. In this way, the data of the applications can remain secure. Indeed, access to such data of an application may not even be allowed by a user entity owning, using and/or operating the application. That is, in one or more cases, no right to access the data of such application has been provided.

Further, the one or more of the processes discussed herein can be scalable. One or more change determinations can be executed and/or generated individually and/or at least partially in parallel with one another. Continuous monitoring can be performed of applications stored at a storage system of interest, to continually (e.g., dynamically) address, such as proactively, maintenance of storage system performance, capacity and/or efficiency.

In one or more embodiments, an analytical model, such as an artificial intelligence (AI) model, machine learning (ML) model, deep learning (DL) model and/or deep neural network (DNN) can be employed. That is, such analytical model can be employed to generate one or more performance category correlations, generate one or more predictions of data object type and/or use, determine one or more storage unit groupings, determine one or more possible modifications, generate one or more thresholds, and/or generate one or more change determinations.

Such analytical model can be trained and/or retrained based on both test data and training data related to historical performance data related to one or more applications. In one or more embodiments, retraining can be based on feedback input by an administrator entity, such as relative to manual adjustment of one or more of the thresholds and/or any other process(es) performed.

Description next turns to one or more embodiments for addressing one or more of the above-identified deficiencies of existing frameworks in maintaining capacity, performance and/or efficiency of a storage system.

The following and above-provided detailed description is merely illustrative and is not intended to limit embodiments and/or application or utilization of embodiments. Furthermore, there is no intention to be bound by any expressed or implied information presented in the preceding Summary section or in the Detailed Description section.

Terminology

As used herein, and as indicated above, an application can employ one or more data objects. A data object can refer to a volume, file, data block, LUN and/or S3 object.

As used herein, "capacity" can refer to storage capacity, remaining capacity, efficient use of capacity and/or capacity savings.

As used herein, "client" can refer to a device, network, application, virtual machine, system, machine, component, hardware, software, smart device and/or human.

As used herein, "cost" can refer to time, money, power, storage, memory, bandwidth and/or manual labor.

As used herein, "data" can comprise metadata and can comprise structured and/or unstructured data.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, "efficiency" can refer to reduction in latency, increase in resource usage and/or increase in resource utilization.

As used herein, "entity" can refer to a device, network, application, virtual machine, system, machine, component, hardware, software, smart device and/or human.

Reference throughout this specification to "one embodiment," "an embodiment," "one implementation," "an implementation," etc. means that a feature, structure or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the features, structures or characteristics may be combined in any suitable manner in one or more embodiments/implementations.

As used herein, "operating parameter" can be a key performance indicator (KPI) such as, but not limited to, degradation, bandwidth and/or service outages.

As used herein, "performance" can refer to lack of latency, resource usage and/or resource utilization.

As used herein, a "server" can refer to computer software and/or hardware that can provide functionality for other clients, programs or devices, and which can manage access to a centralized resource or service in a network.

As used herein, "use" can comprise access to.

As used herein, a "workload" can refer to one or more different types of file, LUN, namespace, etc. workloads that can be imposed on a system by external client entities.

General Description

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any defined order, connection and/or coupling of systems, devices and/or components depicted therein. For example, in one or more embodiments, the non-limiting systems described, and/or systems thereof, can further comprise one or more computer and/or computing-based elements described herein with reference to an operating environment, such as the computing environment 900 illustrated at FIG. 9. In one or more described embodiments, computer and/or computing-based elements can be used in connection with implementing one or more of the systems, devices, components and/or computer-implemented operations shown and/or described in connection with FIGS. 1-8 and/or with other figures described herein.

FIG. 1 illustrates a block diagram illustrating an example of various components of a storage system 100, in accordance with one or more embodiments and/or implementations described herein. In the embodiments illustrated in FIG. 1, storage system 100 comprises a plurality of nodes 110, each comprising one or more data objects 114 and a node controller 112. The storage system 100 can comprise an administrator node 116 that can control one or more functions and/or alterations relative to the nodes 110.

The storage system 100 itself can be accessed over a cloud and/or over a network.

More generally, the storage system 100 can comprise any suitable computing devices, hardware, software, operating systems, drivers, network interfaces and/or so forth. For example, the administrator node 116 can be operably coupled to a suitable processor 107 and memory 109 by a bus 105. In one or more embodiments, the administrator node 116 can comprise the processor 107 and/or memory 109.

Communication among between the illustrated nodes 110 the administrator node 116, and/or the storage maintenance system 102 can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802. XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

In one or more embodiments, the storage system 100 can comprise a processor 107 (e.g., computer processing unit, microprocessor, classical processor and/or like processor). In one or more embodiments, a component associated with storage system 100, as described herein with or without reference to the one or more figures of the one or more embodiments, can comprise one or more computer and/or machine readable, writable and/or executable components and/or instructions that can be executed by processor 107 to facilitate performance of one or more processes defined by such component and/or instruction.

In one or more embodiments, the storage system 100 can comprise a machine-readable memory 109 that can be operably connected to the processor 107. The memory 109 can store computer-executable instructions that, upon execution by the processor 107, can cause the processor 107 and/or one or more other components of the storage system 100 to perform one or more actions. In one or more embodiments, the memory 109 can store computer-executable components.

The storage system 100 and/or a component thereof as described herein, can be communicatively, electrically, operably, optically and/or otherwise coupled to one another via a bus 105 to perform functions of the storage system 100 and/or one or more components thereof and/or coupled therewith. Bus 105 can comprise one or more of a memory bus, peripheral bus, external bus, local bus and/or another type of bus that can employ one or more bus architectures. One or more of these examples of bus 105 can be employed to implement one or more embodiments described herein.

In one or more embodiments, storage system 100 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the storage system 100 can reside in the cloud, and/or can reside locally in a local computing environment.

In addition to the processor 107 and/or memory 109 described above, storage system 100 can comprise one or more computer and/or machine readable, writable and/or executable components and/or instructions that, when executed by processor 107, can facilitate performance of one or more operations defined by such component and/or instruction.

As mentioned above, an application 114 can employ one or more data objects 113. Further, one or more same applications 114 can be stored at the same storage system 100 and/or applications 114 employed in a same workload can be spread out among various containers, such as nodes 110, causing increased bandwidth usage for a workload. These issues can be proactively solved by use of the storage maintenance system 102.

As additionally shown at FIG. 1, the storage system 100 can comprise the storage maintenance system 102. The storage maintenance system 102 can generally address maintenance of one or more of capacity, performance and/or efficiency of the storage system 100 related to the one or more applications 114. This addressing can comprise, but is not limited to, organization, duplication, de-duplication, moving and/or policy generating relative to and/or of the one or more applications 114 and/or data objects 113 employed by the applications 114 and stored at the storage system 100. Although the storage maintenance system 102 is illustrated as being comprised by the storage system at FIG. 1, in one or more other embodiments, the storage maintenance system 102 can be disposed external to and operably coupled to the storage system 100.

Figure 2:
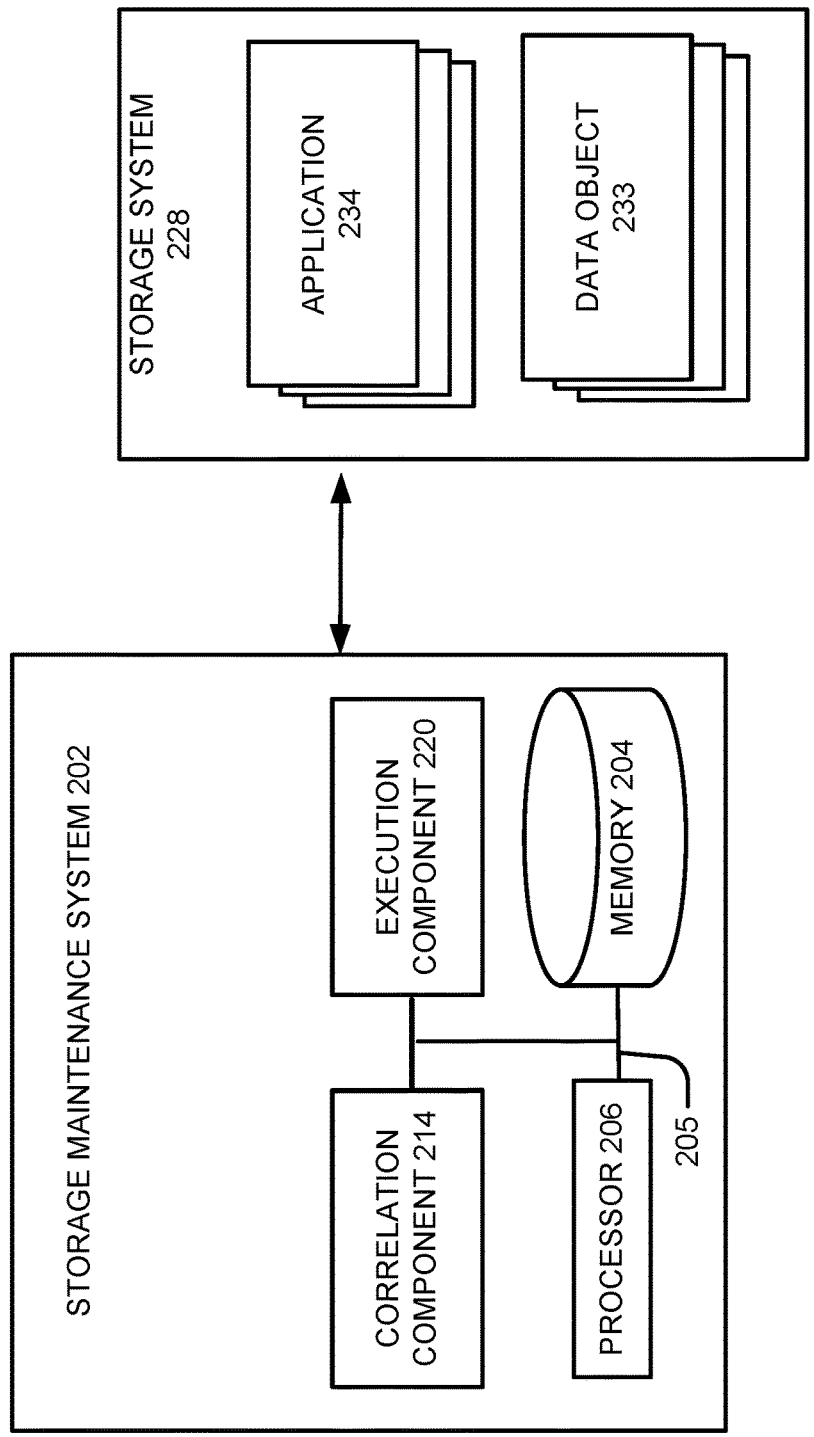
FIG. 2 illustrates a block diagram of a system comprising storage maintenance system, in accordance with one or more embodiments and/or implementations described herein.

Turning next to FIG. 2, a system 200 is illustrated comprising a storage maintenance system 202 that can function to aid a storage system 228 relative to maintenance of one or more of capacity, performance and/or efficiency of the storage system 200. For example, storage system 228 can store a plurality of applications 234. These applications 234 can negatively impact utilization of resources (e.g., compute and storage) as well as performance metrics (e.g., capacity, performance and/or efficiency) of the storage system. Storage maintenance system 202 can proactively address these performance metrics such as by determining and applying one or more change determinations.

The storage maintenance system 202 can be operably coupled to the storage system 228 by a network, cloud and/or any other suitable manner. Additional description of the storage system 228 is not again provided for sake of brevity. Description provided above relative to the storage system 100 can be applicable to the storage system 228.

Briefly, the storage maintenance system 202 can comprise any suitable computing devices, hardware, software, operating systems, drivers, network interfaces and/or so forth. As illustrated, the storage maintenance system 202 can include a correlation component 214 and an execution component 220. A bus 205 can operably couple these components, a processor 206 and a memory 204.

Referring briefly to the aforementioned components, the correlation component 214 can generally, based on performance data (e.g., current performance data and/or historical performance data) for a data object 234 stored at the storage system 228, correlate a performance category with the data object 234. In accordance with various embodiments, examples of performance data can comprise but are not limited to, input/output (I/O) rate, I/O throughput, I/O size, random versus sequential usage, read/write ratio, and/or storage system location.

The execution component 220 generally can, based on the performance category correlated to the data object, execute a modification at the storage system 228 that changes functioning of the storage system 228 relative to the data object 234 of interest.

Figure 3:
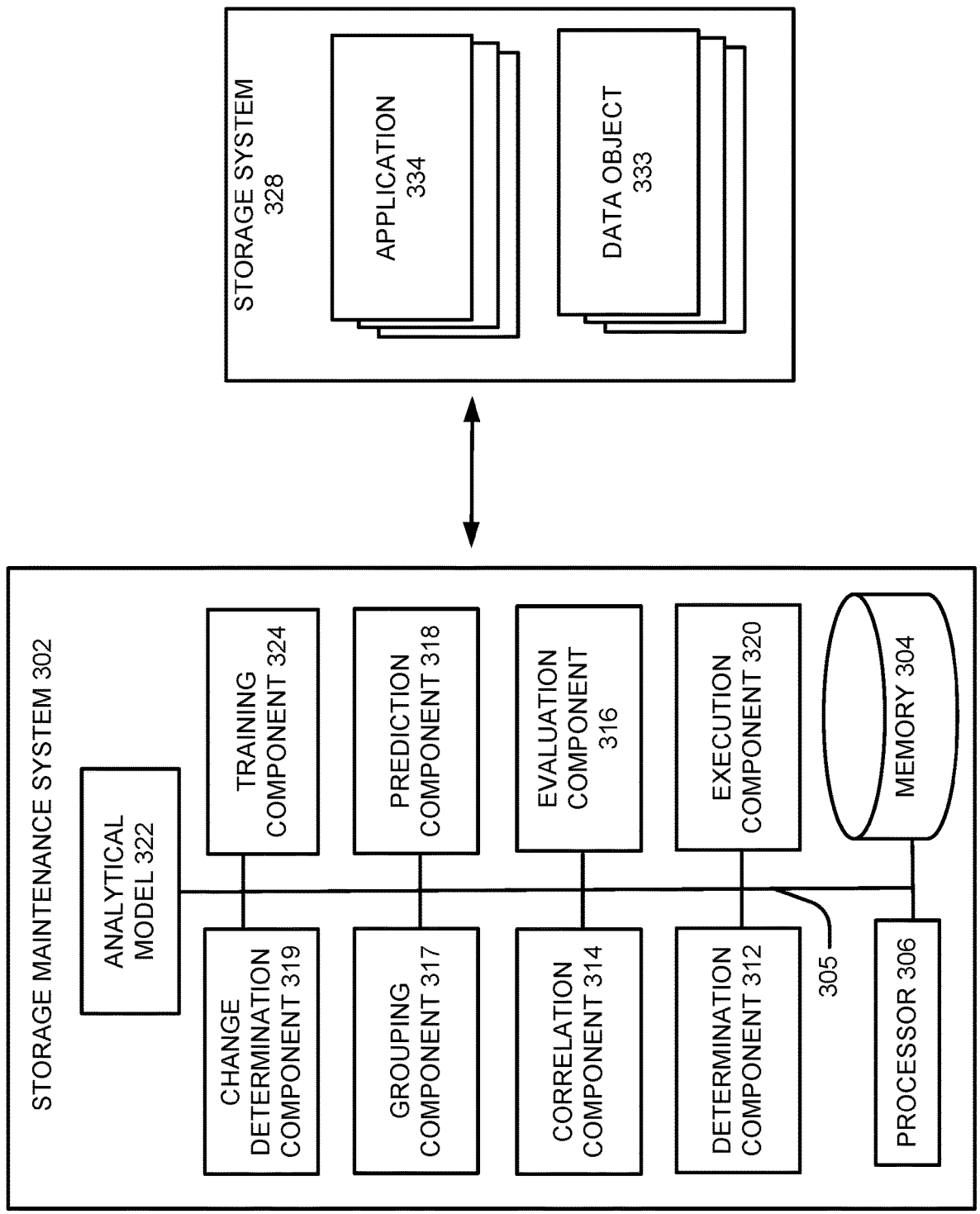
FIG. 3 illustrates a block diagram of another storage maintenance system, in accordance with one or more embodiments and/or implementations described herein.

Turning next to FIG. 3, a system 300 is illustrated and described in greater detail to further illustrate the one or more processes that can be performed by a storage maintenance system embodiment described herein. The system 300 can comprise a storage maintenance system 302 that can function to aid a storage system 328 relative to maintenance of one or more of capacity, performance and/or efficiency of the storage system 300. For example, storage system 328 can store a plurality of applications 334. These applications 334 can negatively impact utilization of resources (e.g., compute and storage) as well as performance metrics (e.g., capacity, performance and/or efficiency) of the storage system. Storage maintenance system 302 can proactively address these performance metrics such as by determining and applying one or more change determinations.

The storage maintenance system 302 can be operably coupled to the storage system 328 by a network, cloud and/or any other suitable manner. Additional description of the storage system 328 is not again provided for sake of brevity. Description provided above relative to the storage system 100 and/or storage system 228 can be applicable to the storage system 328. Likewise, description provided above relative to the storage maintenance system 202 can be applicable to the storage maintenance system 302.

Generally, the storage maintenance system 302 can comprise any suitable computing devices, hardware, software, operating systems, drivers, network interfaces and/or so forth. As illustrated, the storage maintenance system 302 comprises a determination component 312, correlation component 314, evaluation component 316, grouping component 317, prediction component 318, change determination component 319, execution component 320, analytical model 322 and/or training component 324. These components can be comprised by and/or operably coupled to a processor 306, such as by a bus 305, and/or can be software components of a processor 306. Although, in one or more other embodiments, any one or more of these components can be external to the processor 306. The bus 305 operatively couples the processor 306 and a memory 304.

Communication among the components of the storage maintenance system 302 can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802. XX wireless technologies and/or legacy telecommunication technologies, BLUETOOTH®, Session Initiation Protocol (SIP), ZIG-BEE®, RF4CE protocol, WirelessHART protocol, 6LoW-PAN (Ipv6 over Low power Wireless Area Networks), Z-Wave, an ANT, an ultra-wideband (UWB) standard protocol, block protocols such as fibre channel (FC), fibre channel over ethernet (FCoE), non-volatile-memory-express over fabrics (NVMeoF) or internet small computer system interface protocol (iSCSI), file protocols such as network file system (NFS), parallel network file system (pNFS), and common internet file system/server message block (CIFS/SMB), object protocols such as Amazon® Simple Storage Service (S3), and/or other proprietary and/or non-proprietary communication protocols.

In one or more embodiments, the storage maintenance system 302 can include a processor 306 (e.g., computer processing unit, microprocessor, classical processor and/or like processor). In one or more embodiments, a component associated with storage maintenance system 302, as described herein with or without reference to the one or more figures of the one or more embodiments, can comprise one or more computer and/or machine readable, writable and/or executable components and/or instructions that can be executed by processor 306 to facilitate performance of one or more processes defined by such component and/or instruction.

In one or more embodiments, the storage maintenance system 302 can comprise a machine-readable memory 304 that can be operably connected to the processor 306. The memory 304 can store computer-executable instructions that, upon execution by the processor 306, can cause the processor 306 and/or one or more other components of the storage maintenance system 302 to perform one or more actions. In one or more embodiments, the memory 304 can store computer-executable components.

The storage maintenance system 302 and/or a component thereof as described herein, can be communicatively, electrically, operatively, optically and/or otherwise coupled to one another via a bus 305 to perform functions of non-limiting system 300, storage maintenance system 302 and/or one or more components thereof and/or coupled therewith. Bus 305 can comprise one or more of a memory bus, peripheral bus, external bus, local bus and/or another type of bus that can employ one or more bus architectures. One or more of these examples of bus 305 can be employed to implement one or more embodiments described herein.

In one or more embodiments, storage maintenance system 302 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the storage maintenance system 302 can reside in the cloud, and/or can reside locally in a local computing environment.

In addition to the processor 306 and/or memory 304 described above, the storage maintenance system 302 can comprise one or more computer and/or machine readable, writable and/or executable components and/or instructions that, when executed by processor 306, can facilitate performance of one or more operations defined by such component and/or instruction.

Figure 4A:
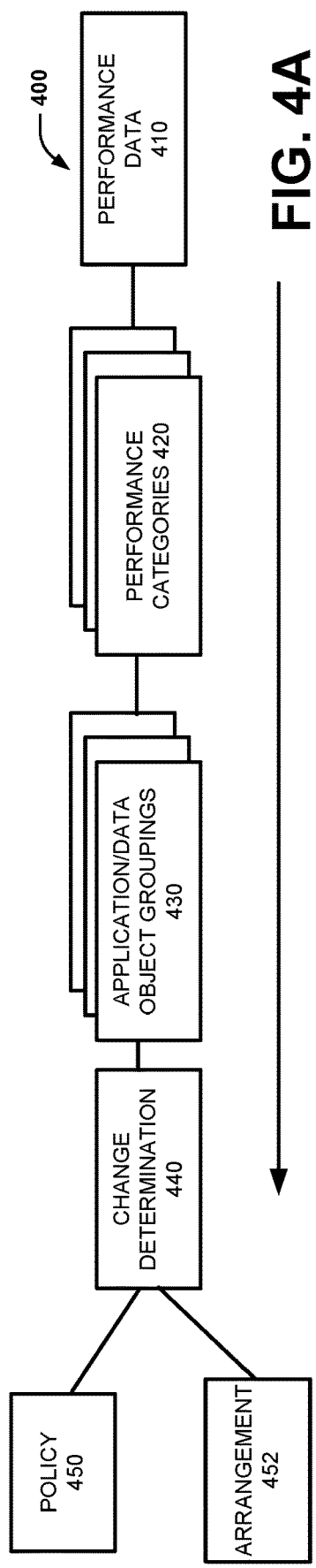
FIG. 4A illustrates a process flow diagram of processes that can be performed by the storage maintenance system of FIG. 3, in accordance with one or more embodiments and/or implementations described herein.

Turning now to FIG. 4A, in addition still to FIG. 3, direction next turns to processes by which the storage maintenance system 302 can proactively address capacity, performance and/or efficiency of the storage system 328. First, the determination component 312 can receive, transmit, locate, identify and/or otherwise obtain various data (e.g., including metadata) that can be employed by the evaluation component 316. The data can be obtained by evaluating applications 334 at the storage system 328. The data can be obtained from logs and/or monitoring. The data can comprise capacity data such as related to and/or defining capacity, performance, efficiency, throughput, rates order of operations performed, number of operations performed, number of times a same operation is performed, workload characterization, and/or changes in storage system data due to use of an application 334 and/or data object 333 employed by the application 334. In an example, the data obtained by the determination component 312 can be indicative of an occurring and/or predictable lowering in capacity, performance and/or efficiency of the storage system 328.

In one or more embodiments, this data further can comprise vendor benchmark data, component classification data, telemetry data, workload, timescale based ranking data, power use data, key performance indicator (KPI) data and/or operation data. Any of these aspects of data can be obtained in a current (e.g., real-time) form and/or as historical (e.g., past) data. Referring to the historical data, such data can be stored at any suitable location, such as the memory 304 and/or another storage database internal to or external to the storage maintenance system 302. The various data mentioned above are not meant to be limiting and can be in any suitable format (e.g., logs, lists, matrices and/or code).

The determination component 312 can obtain such data at any suitable frequency (e.g., repeated obtaining), on-demand and/or upon request. An administrator entity, user entity and/or default setting can determine the frequency of time.

In one or more embodiments, the determination component 312 can obtain a request for a modification at the storage system 328, such as from a user entity, administrator node and/or administrator entity.

In one or more embodiments, the determination component 312 can obtain feedback for implementing an altered grouping and/or threshold (e.g., by the evaluation component 316). The feedback can be provided by any of a user entity, administrator node, administrator entity and/or device associated with such entities.

Turning next to the evaluation component 316, this component generally can perform a plurality of operations and/or processes, based at least in part on the data obtained by the determination component 312. For example, the evaluation component 316 can determine aspects of performance data 410 (FIG. 4A) from the data obtained, determine a reason for a modification, generate a threshold, apply a grouping 430 (FIG. 4A) to an application 234 and/or data object 233 employed by the application 234, and/or generate a change determination 440 (FIG. 4A).

The evaluation component 316 can, based on the data obtained by the determination component 312, determine aspects of performance data 410 (FIG. 4A) for an application 334. The performance data can be related to any of bandwidth, usage, utilization, memory, latency, power, rates and/or operations. The determination can comprise aggregating the data, searching the data, and/or identifying aspects of the data related to one or more defined performance data types and/or performance categories 420.

Turning briefly to the correlation component 314, based on the current data and on historical data, such as of the same types, the correlation component 314 can correlate a defined performance category with the application 334. A performance category can comprise, but is not limited to storage quality of service (storage QoS), input/output (I/O) rate, I/O throughput, I/O size, random versus sequential usage, read/write ratio and/or storage system location. A performance category can be default, provided by a user entity and/or administrator entity, and/or newly generated by the evaluation component 316.

As used herein, "storage QoS" can refer to a feature for monitoring and managing the performance of a storage system. When client I/O enters the storage system it can be tracked as it flows through the various components that make up the storage system. The measurements that are tracked can be used to determine capacity and/or limits of the given storage components. In a similar manner client I/O can be controlled at various points within the storage system. The controls can be used to limit or guaranty the response times of the client I/O and/or throughput within the storage system.

The act of correlation can comprise comparison of the performance data 410 to data defining a performance category 420 (FIG. 4A). The performance data 410 can comprise current aspects and/or historical aspects. The act of correlation further can comprise, based on such comparison, determining relationships between the performance data 410 and a performance category 420. For example, performance data for bandwidth can relate to a performance category of I/O rate. The relationships can be determined using any suitable method, such as defined rulesets, list/table/matrix matching, data trees, and/or node and node edge linking. This process can allow for labeling and/or characterization of applications 334 of the storage system 328 in a uniform matter than can be employed by the storage maintenance system 302 for maintaining the storage system 328.

In one or more embodiments, the act of correlation can comprise determining whether performance data 410 satisfies a threshold for affecting a performance category at the storage system. For example, performance data 410 can be within defined targets and thus, although related to a performance category 420, is not correlated to the performance category 420 because a threshold for affecting (e.g., negatively affecting) the performance category 420 is not satisfied. In an example, performance data 410 for bandwidth for an application 334 can be within defined targets and so the application 334 can be excluded from an I/O rate performance category 420. In another example, performance data 410 for bandwidth for an application 334 can comprise low bandwidth, with the performance data 410 satisfying a threshold for, and thus can be correlated to the I/O rate performance category 420.

Turning next again to the evaluation component 316, this component can generate a threshold related to the performance data. For example, the evaluation component 316 can evaluate the historical data related to one or more known workloads and/or storage system issues. Based on such historical data, the evaluation component 316 can determine a threshold (e.g., quantity) of such performance data when a previous modification at the storage system was implemented, for example. In one or more embodiments, the thresholds can be assigned for a plurality of performance data and/or performance categories, to thus be employed by the evaluation component 316 in future determinations of change determinations for the storage system 328.

The grouping component 317 can evaluate one or more applications 334 and/or one or more data objects 333 employed by the one or more applications 334 to group and/or exclude an application and/or a data object 333 relative to a grouping 430. This grouping can be fully adjustable, rather than being limited to any defined and/or static groupings related only to defined categories. It is appreciated that the grouping can be in function alone, rather than physical grouping of applications 334 and/or data objects 333 together at a volume, aggregate and/or node. That is, the grouping can comprise listing, logging and/or associating of data objects with one another by one or more embodiments described herein based on the performance category 420 associated with the one or more applications 334. In this way, a change determination 440 can be generated relative to more than one application 334 at a time, such as relative to a grouping 430.

In one or more embodiments, a grouping 430 by the grouping component 317 can be based on amount (e.g., quantity) that a performance data (e.g., current) exceeds a related threshold. Additionally, and/or alternatively, a grouping can be based on a priority of a customer entity that owns and/or uses the application 334 and/or data object 333 being grouped or excluded. Such priority can be based on quantity of data objects employed by a customer entity and/or size of customer entity.

In one or more embodiments, exclusion of an application 334 and/or a data object 333 from a group can be based on lack of or low quantity of performance data 410 of the application 334 and/or data object 333 for a performance category 420, limit of size of a group and/or a priority of an application 334.

In one or more embodiments, the prediction component 318 can, based on the performance data 410 and/or performance category 420 for an application 334, predict a type of application and/or use of an application. A "type" can refer to application category such as word processing, spreadsheet, presentation, multimedia, web browser, graphics related, education, resource planning, customer relationship management, and/or the like. A "use" can refer to any definition related to a workload, such as repeated use, order of use, non-use and/or sequential use. This prediction can be employed to further label and/or characterize an application 334, again without compromising a state of non-access to data of, comprised by and/or making up the application 334. This prediction can be employed to determine a grouping 430 and/or to generate a change determination 440, among other uses, such as by the evaluation component 316.

That is, the applications can be analyzed, such via analyzing behavior of the applications, actions caused by the applications, and/or changes resulting from execution of the applications without direct access to data comprised by the applications. Thus, respective states of non-access/non-intrusion to data of the applications are not compromised. In this way, the data of the applications can remain secure. Indeed, access to such data of an application may not even be allowed by a user entity owning, using and/or operating the application. That is, in one or more cases, no right to access the data of such application has been provided.

Next, the change determination component 319 can evaluate and use the performance data 410 identified previously. In one or more embodiments, the change determination component 319 can determine based on comparison of the performance data 410, to default settings and/or thresholds for the storage system 328, that a maintenance of the storage system 328 can be performed. In one or more embodiments, the change determination component 319 can compare the current obtained performance data to historical performance data. Based on this comparison, the change determination component 319 can determine that an issue is occurring or predicted to occur.

In one or more embodiments, the change determination component 319 can compare such current performance data and/or historical performance data to current workloads (e.g., to data characterizing the workloads) to determine where an issue can occur and/or where a property (e.g., capacity, performance and/or efficiency) of the storage system 328 can be increased, even if an issue is not occurring and/or predicted. For example, one or more aspects of historical data can be representative of a past workload characterization. Where the change determination component 319 determines that the current performance data is similar to, approaching, the same as and/or otherwise aligned with such historical data, the change determination component 319 can turn to generating a change determination 440.

In one or more embodiments, based on the comparisons, the change determination component 319 can determine that a threshold is being approached and/or is already satisfied (e.g., is met and/or exceeded). One or more indications of approach of and/or satisfaction of a threshold can be communicated in the form of indication data. Where the change determination component 319 determines and/or is based on a determination that a threshold has been satisfied, the change determination component 319 can turn to generating a change determination 440.

Turning next to generation of a change determination to maintain the storage system 328 relative to the one or more applications 334 of interest, the change determination component 319 can, based on the groupings 430 (FIG. 4A), predictions, performance categories and/or customer entity priority, generate one or more suggested modifications to be implemented at the storage system 328, which one or more suggested modifications can be provided in the form of a change determination 440 (FIG. 4A). A suggested change can be for any application 334 and/or data object 333 that would address a storage system capacity, performance and/or efficiency. A suggested modification at the storage system can comprise but is not limited to generation of a policy 450 (e.g., directed to access, priority, order of operations, data protection, data retention and/or data de-duplication) and/or arrangement 452 (e.g., movement, copy, de-duplication) of an application 334 and/or data object 333.

In one or more embodiments, to generate the change determination 440, the prediction component 318 can predict performance data for one or more applications 334, nodes, volumes and/or aggregates that would result if the change determination were executed. Based on this prediction, a change determination can be validated and/or revised by the change determination component 319. For example, the change determination component 319, based on historical performance data for the storage system 328 can determine that movement of a grouping of one or more applications 334 and/or data objects 333 defined by a performance category will not provide a desired modification at the storage system (e.g., relative to storage system capacity, performance and/or efficiency), but that movement of two groupings will provide the desired change in function of the storage system (e.g., in view of a desired modification). Accordingly, based on this determination, the evaluation component can revise and validate a change determination 440.

In one or more embodiments, data defining the validated change determination 440 can be communicated to and/or otherwise obtained by the execution component 320.

Turning next to the execution component 320, this component can generally employ the change determination 440 generated by the evaluation component 316 for directing, instructing, communicating, implementing and/or directly/indirectly making the modification (e.g., policy-based and/or arrangement-based) at the storage system 328 relative to the application 334 and/or data object 333 of interest and/or for a grouping 430 comprising the application 334 and/or data object 333 of interest. This employment can comprise directing, instructing and/or communicating with the administrator node 116.

The modification can comprise a revision to the application 334 and/or data object 333 of interest, or to a different application and/or data object. For example, by arranging (e.g., moving) a second application and/or data object, the application 334 of interest can be enabled to better perform. This can be, for example, due to reduced bandwidth, memory and/or power usage at a node 110 comprising the application 334 of interest.

The modification at the storage system can comprise changing a functioning of the storage system comprising that a different aggregate and/or node can be used to access an application that has been moved, that a read/write/get can refer to a different aggregate and/or node due to the application move, that similar applications and/or related data objects can be stored together, that one or more applications and/or related data objects can be de-duplicated, and/or that one or more workloads, nodes, aggregates, volumes and/or the storage system can operate with increased efficiency, capacity and/or performance.

The execution component 320 can execute such modification and/or modifications one at a time and/or with any two or more modification being executed at least partially in parallel with one another. In an example, first modification executed by the execution component 320 can be individual, and based on data representing user entity feedback, can increase in frequency and/or in quantity of modifications being executed in parallel to one another.

In one or more embodiments, an order of execution of plural generated change determinations 440 can be based on amount (e.g., quantity) that an aspect of performance data (e.g., current) exceeds a related threshold. Additionally, and/or alternatively, an order of execution can be based on a priority of a customer entity that owns and/or uses an application 334 of interest. Such priority can be based on quantity of storage units employed by a customer entity and/or size of customer entity.

It will further be appreciated that the aforementioned processes can be repeated based on newly-obtained performance data, such as, but not limited to, new workload characterization data, CPU performance data, aggregate backend performance data, and/or storage capacity data for any component the storage system, such as obtained by the determination component 312.

For example, the correlation component 314 can re-correlate at least one data object 334 with an additional and/or alternative performance category 420. This re-correlation can be performed at a defined frequency of time and/or upon notification from the determination component 312 of newly available performance data, such as absent notification from a user entity/administrator entity external to the storage maintenance system 302. An administrator entity, user entity and/or default setting can determine the defined frequency of time.

For another example, the grouping component 317, such as based on the re-correlation, can re-group the application 334 and/or data object 333 and/or the change determination component 319 can re-determine another change determination (e.g., for a modification comprising a revision to one or more applications/data objects/groupings). This can be performed at a defined frequency of time and/or upon notification from the correlation component 314 of a newly available correlation, and/or upon notification from the determination component 312 of newly available performance data, such as absent notification from a user entity/administrator entity external to the storage maintenance system 302. An administrator entity, user entity and/or default setting can determine the defined frequency of time.

For yet another example, the execution component 320 can re-execute/execute a new modification at the storage system 328, based on the new/other change determination. This can be performed at a defined frequency of time and/or upon notification from the evaluation component 316 of a newly available change determination, such as absent notification from a user entity/administrator entity external to the storage maintenance system 302. An administrator entity, user entity and/or default setting can determine the defined frequency of time.

In one or more embodiments, the storage maintenance system 302 can comprise an analytical model 322. The analytical model 322 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised, self-supervised, semi-self-supervised and/or unsupervised. For example, the analytical model 322 can comprise an ML model.

Figure 4B:
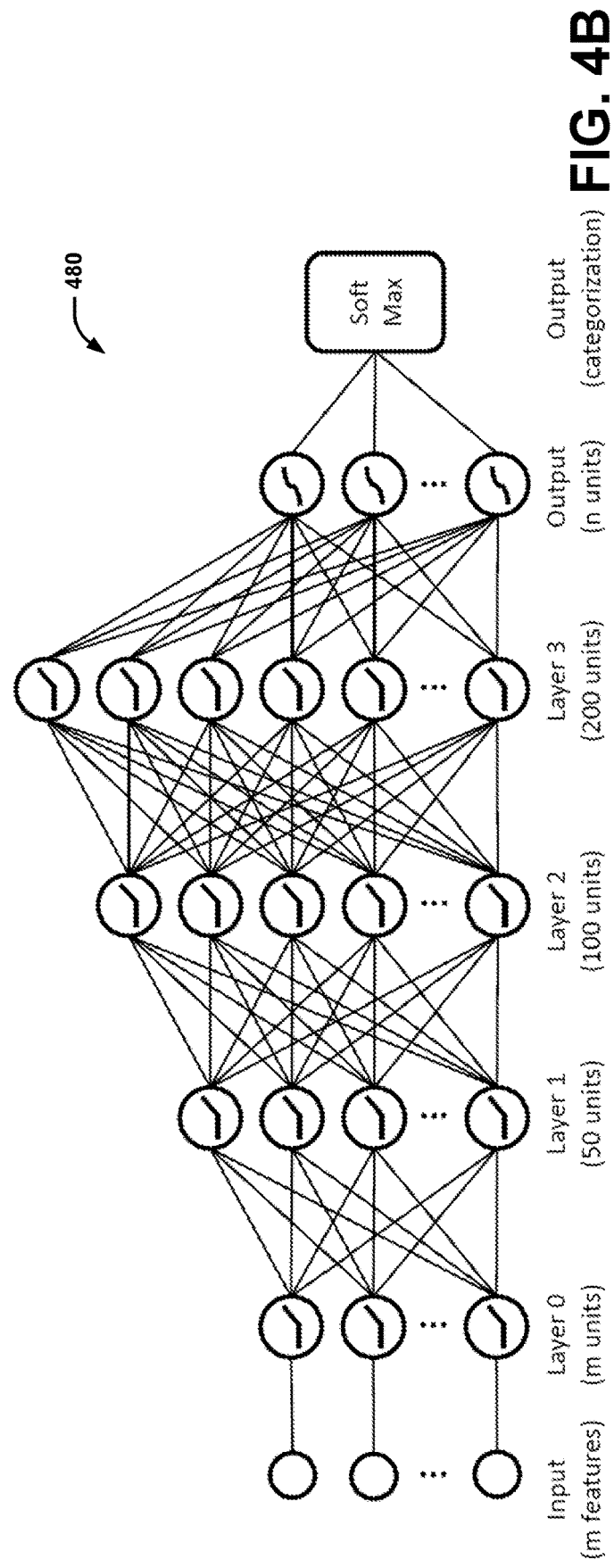
FIG. 4B illustrates a schematic diagram of an exemplary analytical model that can be employed by the storage maintenance system of FIG. 3, in accordance with one or more embodiments and/or implementations described herein.

Looking briefly to FIG. 4B, the analytical model can comprise a multi-layered sequential neural network that can rely on the aforementioned performance data to generate one or more predictions of type and/or use of one or more applications 334 and/or generate one or more change determinations 440.

The analytical model 322 generally can evaluate known performance data, such as historical performance data and/or current performance data. In one or more cases, the analytical model 322 can aid the correlation component 314 in determining a correlation of one or more applications 334. For example, the analytical model 322 can obtain the performance data 410 identified from the evaluation component 316 and can obtain performance categories 420. Based on this information, the analytical model 322 can compare the performance data 410 and performance categories 420 and assign (e.g., correlate) one or more performance categories 420 with one or more applications 334.

For another example, the analytical model 322 can obtain the assigned performance categories 420 from the correlation component 314 and can group into a grouping 430 and/or exclude from a grouping 430 one or more applications 334 and/or data objects 333, such as based on common, same and/or similar performance categories. Likewise, such grouping and/or excluding by the analytical model 322 can consider the one or more predictions of type and/or use of the applications 334 by the evaluation component 316.

In one or more embodiments, the analytical model 322 can aid the evaluation component 316 in generating such one or more predictions of type and/or use of one or more applications 334. That is, the analytical model 322 can obtain the performance data 410 and/or any other relevant workload characterization data, compare such data to historical performance data and/or historical workload characterizations, and based on the comparison, generate the one or more predictions.

For another example, the analytical model 322 can aid the evaluation component 316 in determining a change determination 440. That is, the analytical model 322 can, based on a grouping 430, performance category 420 and/or prediction, and/or on any other comparison of performance data 410, determine a modification (e.g., policy 450 and/or arrangement 452) at the storage system 328 that can affect storage system capacity, performance and/or efficiency.

Alternatively, it will be appreciated that the storage maintenance system 302 can function absent use of the analytical model 322 for any one or more of the aforementioned processes.

Generally, the analytical model 322 can be trained, such as by a training component 324, on a set of training data that can represent the type of data for which the storage maintenance system 302 will be used. That is, the analytical model 322 can be trained on historical and/or current data comprising performance data such as defining/representing workload characterization and/or application performance. Likewise, the analytical model 322 can be trained on new software and/or hardware of the storage system 328, such as relative to a new node, aggregate, volume, disk and/or application 334 at the storage system 328.

Figure 5:
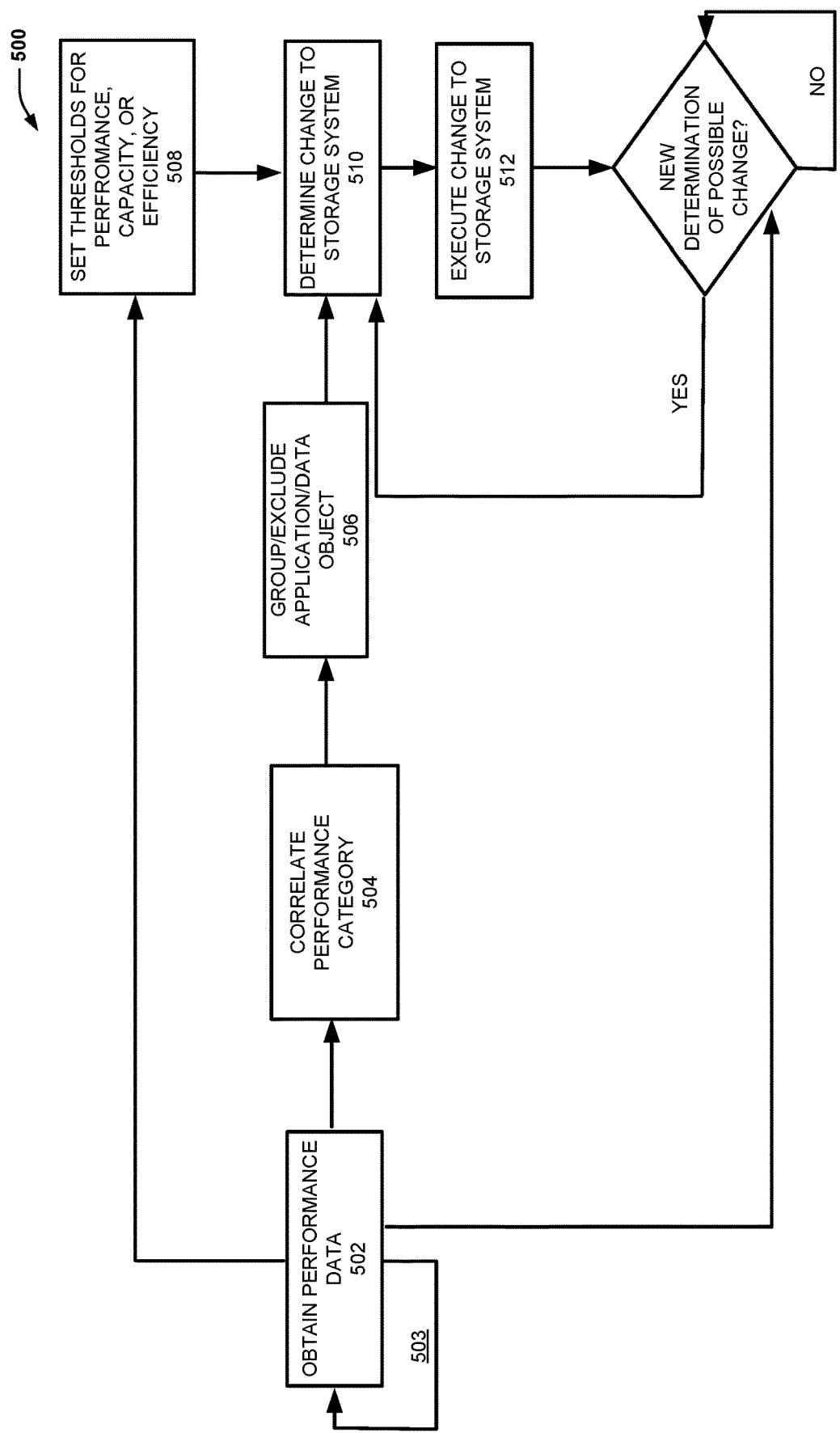
FIG. 5 illustrates yet another process flow diagram of one or more processes, inputs and/or outputs of the storage maintenance system of FIG. 3, in accordance with one or more embodiments and/or implementations described herein.

Referring now briefly to FIG. 5, an example process flow 500 is illustrated as a summary of one or more processes, inputs and/or outputs of the storage maintenance system 302. As illustrated, a process 502 of obtaining performance data can be performed, such as by the determination component 312. It is noted that the process 502 of obtaining performance data can be repeatedly performed (e.g., at loop 503) in real time, at any suitable frequency, on demand, and/or upon request, such as to allow for collection of data that can be employed (e.g., by the evaluation component 316).

The data can be employed for process 504 of correlating a performance category to an application, such as by the evaluation component 316. Based on the correlation, a process 506 of grouping and/or excluding from a group an application 334 and/or data object 333, such as by the grouping component 317.

The performance data also can be employed for process 508 of determining and setting (e.g., by the evaluation component 316) one or more thresholds for performance capacity and/or efficiency upon which a change determination 440 (FIG. 4A) to the storage system can be based.

Further, the change determination component 319 can perform a process 510 of determining a change determination 440 to the storage system based on the performance category 420 (FIG. 4A), grouping 430 (FIG. 4A) and/or threshold. In response, and based on the change determination 440 to be implemented, the execution component 320 can perform a process 512 of executing/implementing the associated modification at the storage system.

Next, a determination 514 of whether another modification at the storage system can further facilitate storage system maintenance, such as by the change determination component 319 based on performance data collected by the determination component 312, should be implemented. If the answer is no, the determination 514 can be re-evaluated at a suitable frequency, on demand and/or upon request. If the answer is yes, and a determination is generated, process 510 of generating a change determination 440 can again be performed.

Figure 6:
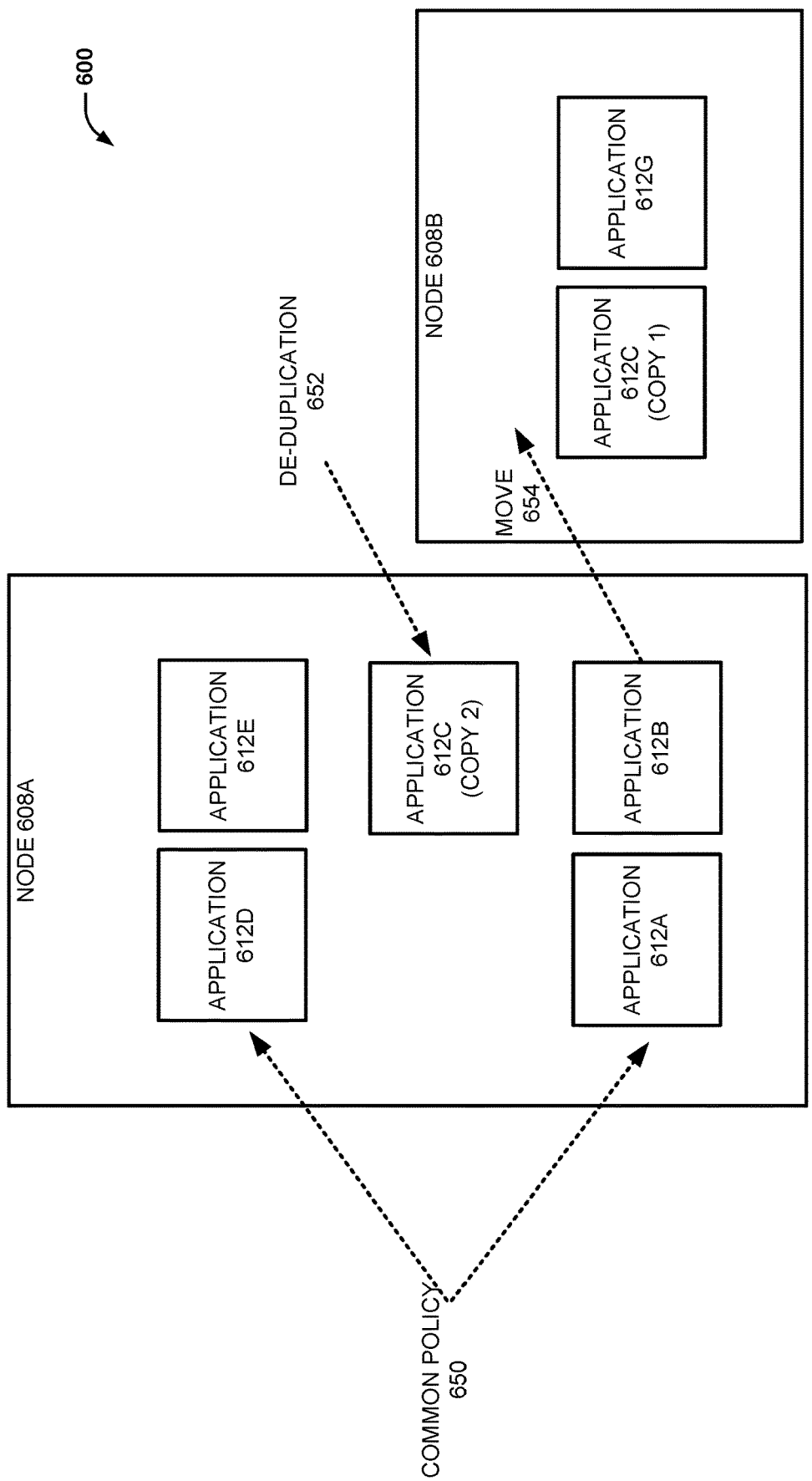
FIG. 6 illustrates a process flow diagram of a method of automatic self-maintenance at a storage system, in accordance with one or more embodiments and/or implementations described herein.

Turning now to FIG. 6, the process 512 of executing a modification to the storage system, comprising changing a functioning of the storage system relative to the application of interest, is illustrated for three different examples.

As illustrated at FIG. 6, the storage system 600 can comprise at least a pair of nodes 608A and 608B. Node 608A can comprise applications 612A-612E. Node 608B can comprise data objects 612C (a copy) and 612G. It is noted that in one or more other embodiments, the one or more modifications (e.g., 650, 652 and/or 654) can additionally and/or alternatively be applied to a data object discovered to be or determined to be employed by an application 612A-612E.

A first example modification that can be executed (e.g., by the execution component 320) at the storage system 600 can be generation of and implementation of a common policy 650 that affects both applications 612A and 612D. For example, each of these objects can have high usage relative to a workload or a high prioritized client entity. The common policy 650 can comprise increased access priority, common I/O control rate and/or common I/O throughput to applications 612A and 612D. Such modification can increase storage system efficiency and storage system performance.

A second example modification that can be executed (e.g., by the execution component 320) at the storage system 600 can be a de-duplication 652. That is, it can be determined (e.g., by the evaluation component 316) that a same version of application 612C is stored at each of node 608A and 608B. One of the copies of the application 612C can be deleted and workloads and/or use of the deleted copy re-routed to the remaining version of application 612C. Such modification can increase storage system capacity and storage system performance.

A third example modification that can be executed (e.g., by the execution component 320) at the storage system 600 can be a move 654 of application 612B from node 608A to 608B. The move can be for any suitable purpose determined by the change determination component 319, such as to physically group together applications of a same type, applications being used for certain workloads or by certain client entities, and/or applications having a same or similar performance category. Such modification can increase storage system efficiency and storage system performance. Such modification likewise can increase storage system capacity at node 608A.

Alternatively, for a fourth example, the application 612B can be copied to node 608B, and thus a copy can exist at both node 608A and 608B. For example, based on a determination by the change determination component 319 that the application 612B is associated with a given storage container, a protection policy can be automatically applied to the storage container (e.g., generated by the change determination component 319 and executed by the execution component 320). That is the application and/or data defining the application can warrant replication to two different geographies, such as for protection and/or to insure proper performance relative to the application 612B. Such modification can increase storage system efficiency and storage system performance.

That is, a change determination can be generated comprising one or more modifications at a storage system. Where plural modifications are prescribed by a change determination, such plural modifications can be proposed relative to different aggregates, volumes and/or nodes. Such aggregated modifications can comprise policies, moves and/or copies of data within a node or between/among two or more nodes.

Further, aggregated modifications can be determined at least partially in parallel with one another, rather than separately. For example, at least two of the common policy 650, move 654 and/or de-duplication 652 can be performed at least partially in parallel with one another.

It is noted that relative to generation of a change determination, the change determination component 319 can consider an effect of a modification on other applications at a node at which a modification is applied and/or to other applications at a group of interest (e.g., a set of applications determined to be a group by the grouping component 317).

Figure 7:
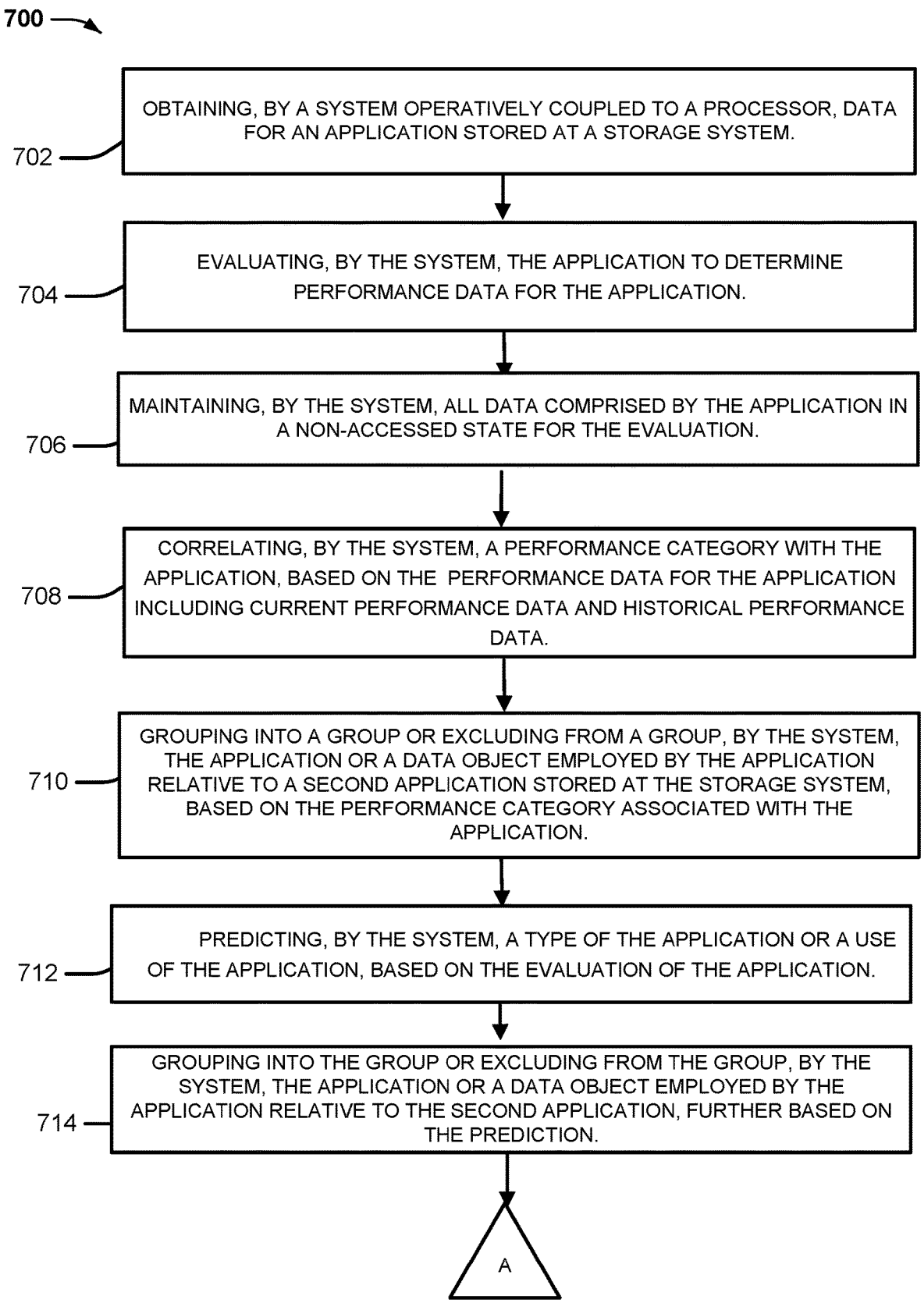
FIG. 7 illustrates a process flow diagram of automatic self-maintenance at a storage system, in accordance with one or more embodiments and/or implementations described herein.
Figure 8:
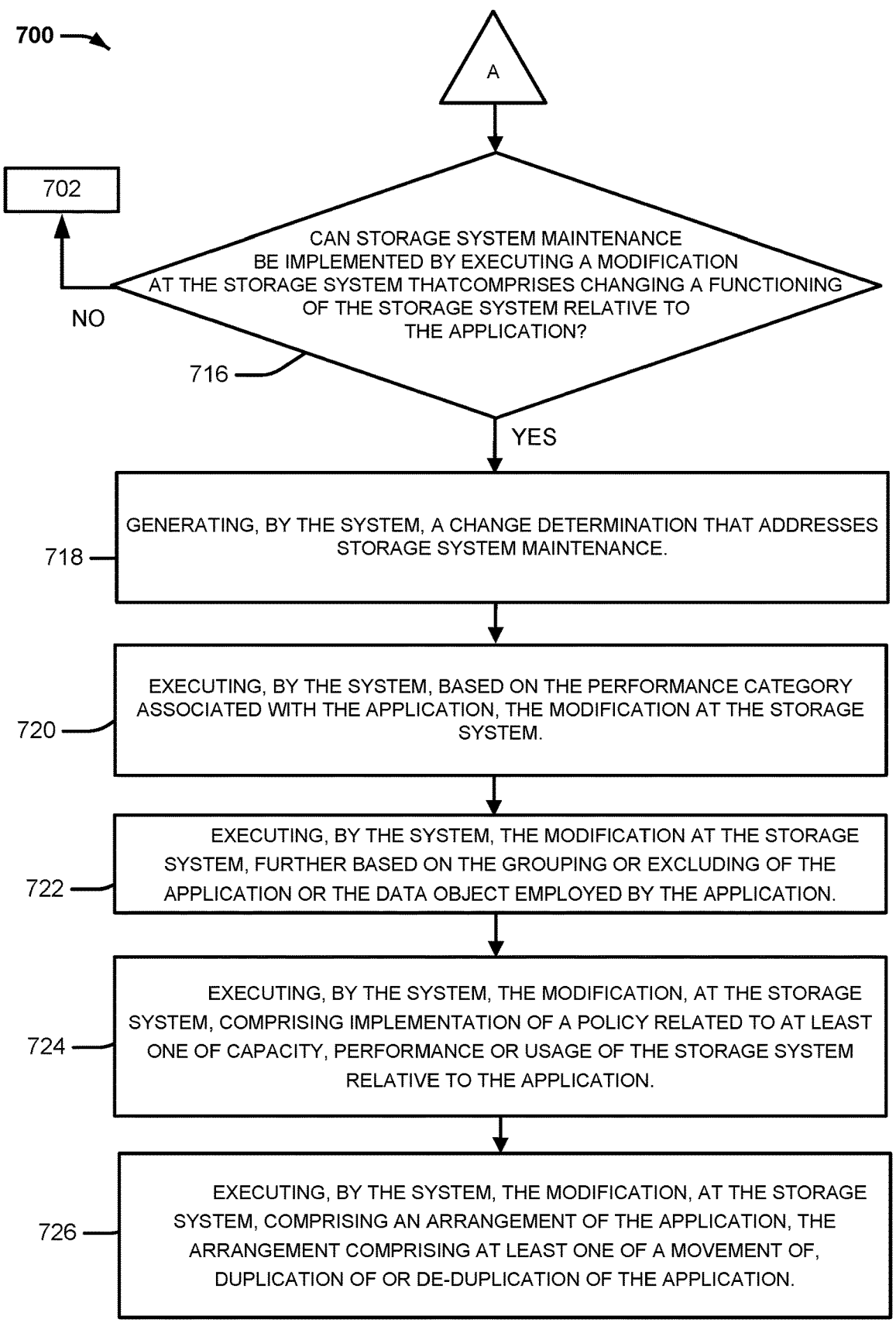
FIG. 8 illustrates a continuation of the process flow diagram of FIG. 7 of a method of automatic self-maintenance at a storage system, in accordance with one or more embodiments and/or implementations described herein.

To provide a summary of the above-described one or more embodiments, FIGS. 7 and 8 illustrate is a flow diagram of an example, non-limiting method 700 that can facilitate a process to determine and address storage system maintenance, in accordance with one or more embodiments described herein, such as the non-limiting systems 200 and/or 300. Repetitive description of like elements and/or processes employed in respective embodiments is omitted for the sake of brevity. It is noted that the non-limiting method 700 continues from FIG. 7 to FIG. 8.

Turning first to 702, the non-limiting method 700 can comprise obtaining, by a system operatively coupled to a processor (e.g., determination component 312), data for a application at the storage system.

At 704, the non-limiting method 700 can comprise evaluating, by the system (e.g., evaluation component 316), the application to determine performance data for the application, which performance data can comprise historical and/or current performance data.

At 706, the non-limiting method 700 can comprise maintaining, by the system (e.g., storage maintenance system 302), all data comprised by the application in a non-accessed state for the evaluation.

At 708, the non-limiting method 700 can comprise correlating, by the system (e.g., correlation component 314), a performance category with the application, based on performance data for the application including current performance data and historical performance data.

At 710, the non-limiting method 700 can comprise grouping into a group or excluding from a group, by the system (e.g., grouping component 317), the application or a data object employed by the application relative to a second application stored at the storage system, based on the performance category associated with the application.

At 712, the non-limiting method 700 can comprise predicting, by the system (e.g., prediction component 318), a type of the application or a use of the application, based on the evaluation of the application.

At 714, the non-limiting method 700 can comprise grouping into the group or excluding from the group, by the system (e.g., grouping component 317), the application or data object employed by the application relative the second application, further based on the prediction.

At 716, the non-limiting method 700 can comprise determining, by the system (e.g., change determination component 319), whether storage system maintenance can be implemented by executing a modification at the storage system comprising changing a functioning of the storage system relative to the application. Where the answer is yes, the non-limiting method 700 can proceed to step 718. Where the answer is no, the non-limiting method 700 can proceed back to step 702, such as starting over the non-limiting method 700 from the first step.

At 718, the non-limiting method 700 can comprise generating, by the system (e.g., change determination component 319), a change determination that addresses storage system maintenance.

At 720, the non-limiting method 700 can comprise executing, by the system (e.g., execution component 320) based on the performance category associated with the application, the modification (e.g., defined by the change determination) at the storage system.

At 722, the non-limiting method 700 can comprise executing, by the system (e.g., execution component 320), the modification at the storage system, further based on the grouping or excluding of the application or a data object employed by the application.

At 724, the non-limiting method 700 can comprise executing, by the system (e.g., execution component 320), the modification, at the storage system, comprising implementation of a policy related to at least one of capacity, performance or usage of the storage system relative to the application.

At 726, the non-limiting method 700 can comprise executing, by the system (e.g., execution component 320), the modification, at the storage system, comprising an arrangement of the application, the arrangement comprising at least one of a movement of, duplication of or de-duplication of the application.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, computer program products, and/or computer-implemented methods are provided herein directed to an automated process to determine and apply modifications at a storage system. A system can comprise a memory that stores computer executable components, and a processor that executes the computer executable components stored in the memory. The computer executable components can comprise a correlation component that, based on performance data, such as current performance data and/or historical performance data, for an application stored at a storage system, correlates a performance category with the application, and an execution component that, based on the performance category correlated to the application, executes a modification at the storage system, wherein the modification at the storage system comprises changing a functioning of the storage system relative to the application. In an embodiment, the data comprised by the application can be maintained in a non-accessed state to execute the modification at the storage system.

An advantage of one or more of the above-indicated method, system and/or non-transitory computer-readable medium can be dynamically adjustable storage system application movement and/or policy generation, such as based on one or more revisions in performance data and/or workload characterization for one or more applications stored at the storage system. As a result, workload performance using the storage system can be improved, such as related to latency and operations.

Another advantage of one or more of the above-indicated method, system and/or non-transitory computer-readable medium can be setting of dynamically adjustable thresholds for performance or efficiency at the storage system upon which the dynamic adjustment can be executed. That is, as opposed to defined static thresholds (e.g., high, medium, and low), full variation of thresholds can be employed. Likewise, grouping of application based on performance metrics also can be dynamically adjustable, as opposed to use of defined static ranks (e.g., high, medium, and low). Accordingly, greater correspondence to a desired effect can be achieved relative to a modification that comprises changing a functioning of the storage system.

Yet another advantage of one or more of the above-indicated method, system and/or non-transitory computer-readable medium can be lack of reliance on human intervention for the execution of modifications at the storage system.

Further, another advantage of one or more of the above-indicated method, system and/or non-transitory computer-readable medium can be maintaining non-access to data of the applications, such as all data of the applications. Indeed, in one or more cases, no right to access the actual applications has been provided.

Another advantage of any one or more of the aforementioned system, computer program product and/or computer-implemented method can be self-improvement of the system such as by continually training analytical models employed by the system, at a suitable frequency. The analytical models can be employed generate the correlations, groupings and/or change determinations to be implemented at the storage system to achieve the aforementioned storage system increase in performance and/or efficiency. Due to the updating, subsequent iterations of use of the one or more of the aforementioned system, computer program product and/or computer-implemented method can be made more accurate and/or efficient.

In one or more embodiments, the analytical models can be updated based on realtime data determined after a modification execution. The update can be performed based on one or more aspects of performance data, issue occurrences, new hardware and/or new software upon which the analytical model has not previously been trained. Due to such updating, subsequent iterations of use of the system can be made more accurate and/or efficient.

Indeed, in view of the one or more embodiments described herein, a practical application of the systems, computer-implemented methods, and/or computer program products described herein can be the implementation of a modification at a storage system that comprises changing a functioning of the storage system relative to an application for which the modification was implemented. Yet another practical application can be the ability to automatically maintain storage system capacity, performance and/or efficiency based on data relevant to applications stored at the storage system, but while maintaining a non-accessed state of the applications. In view thereof, workloads employing the storage system can be better implemented and made more efficient. Overall, such computerized tools can constitute a concrete and tangible technical improvement in the field of storage system usage.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to evaluating application performance data and/or predicting application type and/or use, as compared to existing systems and/or techniques lacking such approach(es). Systems, computer-implemented methods, and/or computer program products facilitating performance of these processes are of great utility in the field of storage system usage and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically correlate a performance category to a application, predict a type and/or use of a application, and/or automatically cause a modification at a storage system to address storage system maintenance as the one or more embodiments described herein can facilitate these processes. And, neither can the human mind nor a human with pen and paper electronically effectively electronically perform these processes, as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

Figure 9:
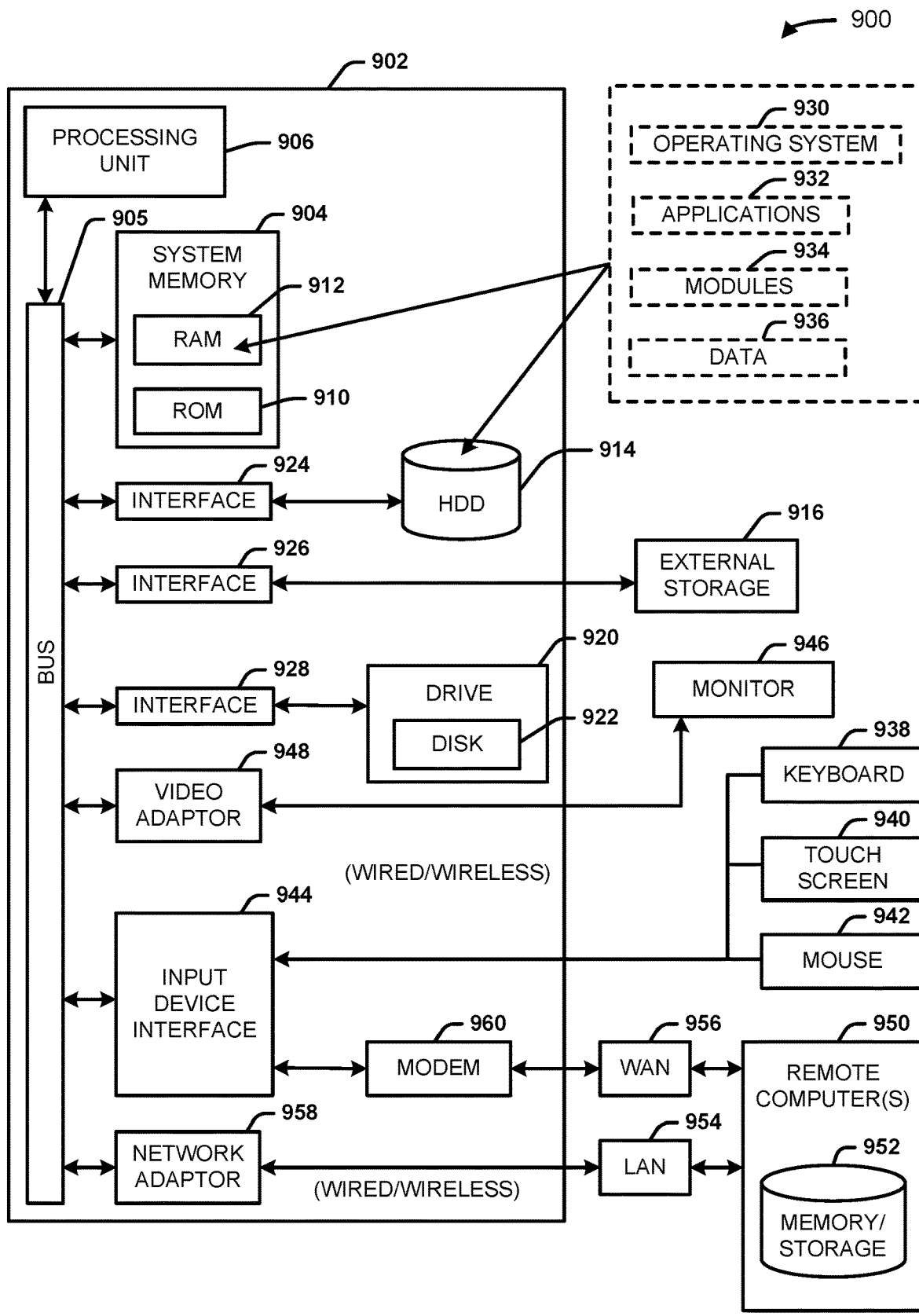
FIG. 9 illustrates a block diagram of an example, non-limiting, computing environment in which one or more embodiments described herein can be facilitated.
Figure 10:
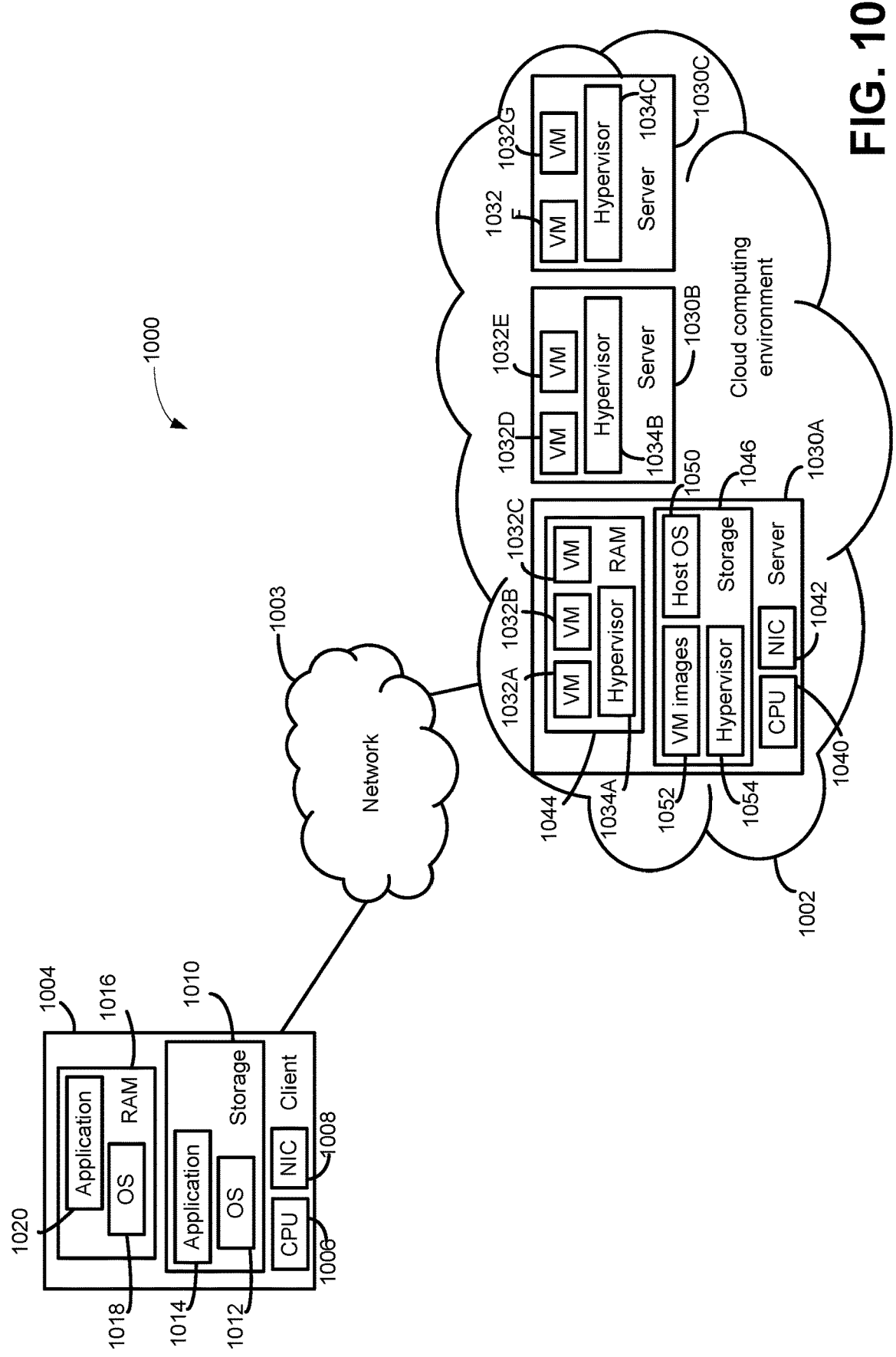
FIG. 10 illustrates a block diagram of an example, non-limiting, cloud computing environment, in accordance with one or more embodiments described herein.

Turning next to FIGS. 9 and 10, a detailed description is provided of additional context for the one or more embodiments described herein at FIGS. 1-8.

FIG. 9 and the following discussion are intended to provide a brief, general description of a suitable operating environment 900 in which one or more embodiments described herein at FIGS. 1-8 can be implemented. For example, one or more components and/or other aspects of embodiments described herein can be implemented in or be associated with, such as accessible via, the operating environment 900. Further, while one or more embodiments have been described above in the general context of computer-executable instructions that can run on one or more computers, those skilled in the art will recognize that one or more embodiments also can be implemented at least partially in parallel with other program modules and/or as a combination of hardware and software.

Generally, program modules include routines, programs, components and/or data structures, that perform tasks and/or implement abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based consumer electronics and/or programmable consumer electronics, any of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 9, the example operating environment 900 for implementing one or more embodiments of the aspects described herein can include a computer 902, the computer 902 including a processing unit 906, a system memory 904 and/or a system bus 905. One or more aspects of the processing unit 906 can be applied to processors such as 206 and/or 306 of the non-limiting systems 200 and/or 300. The processing unit 906 can be implemented at least partially in parallel with and/or alternatively to processors such as 206 and/or 306.

Memory 904 can store one or more computer and/or machine readable, writable and/or executable components and/or instructions that, when executed by processing unit 906 (e.g., a classical processor, and/or like processor), can facilitate performance of operations defined by the executable component and/or instruction. For example, memory 904 can store computer and/or machine readable, writable, and/or executable components and/or instructions that, when executed by processing unit 906, can facilitate execution of the one or more functions described herein relating to non-limiting system 200 and/or non-limiting system 300, as described herein with or without reference to the one or more figures of the one or more embodiments.

Memory 904 can comprise volatile memory (e.g., random access memory (RAM), static RAM (SRAM) and/or dynamic RAM (DRAM)) and/or non-volatile memory (e.g., read only memory (ROM), programmable ROM (PROM), electrically programmable ROM (EPROM) and/or electrically erasable programmable ROM (EEPROM)) that can employ one or more memory architectures.

Processing unit 906 can comprise one or more types of processors and/or electronic circuitry (e.g., a classical processor and/or like processor) that can implement one or more computer and/or machine readable, writable and/or executable components and/or instructions that can be stored at memory 904. For example, processing unit 906 can perform one or more operations that can be specified by computer and/or machine readable, writable, and/or executable components and/or instructions including, but not limited to, logic, control, input/output (I/O) and/or arithmetic. In one or more embodiments, processing unit 906 can be any of one or more commercially available processors. In one or more embodiments, processing unit 906 can comprise one or more central processing unit, multi-core processor, microprocessor, dual microprocessors, microcontroller, System on a Chip (SOC), array processor, vector processor, and/or another type of processor. The examples of processing unit 906 can be employed to implement one or more embodiments described herein.

The system bus 905 can couple system components including, but not limited to, the system memory 904 to the processing unit 906. The system bus 905 can comprise one or more types of bus structure that can further interconnect to a memory bus (with or without a memory controller), a peripheral bus, and/or a local bus using one or more of a variety of commercially available bus architectures. The system memory 904 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can include a high-speed RAM, such as static RAM for caching data.

The computer 902 can include an internal hard disk drive (HDD) 914 (e.g., EIDE, SATA), one or more external storage devices 916 (e.g., a magnetic floppy disk drive (FDD), a memory stick or flash drive reader and/or a memory card reader) and/or a drive 920, e.g., such as a solid state drive or an optical disk drive, which can read or write from a disk 922, such as a CD-ROM disc, a DVD and/or a BD. Additionally, and/or alternatively, where a solid-state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid-state drive (SSD) can be used in addition to, or in place of, an HDD 914. The HDD 914, external storage device 916 and drive 920 can be connected to the system bus 905 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules, and/or data can also be cached in the RAM 912. The systems and/or methods described herein can be implemented utilizing one or more commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise one virtual machine (VM) of multiple VMs hosted at computer 902. Furthermore, operating system 930 can provide runtime environments, such as the JAVA® and/or Python® runtime environment or the .NET framework, for applications 932. Runtime environments are consistent execution environments that can allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

An entity can enter and/or transmit commands and/or information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera, a gesture sensor input device, a vision movement sensor input device, an emotion or facial detection device, a biometric input device, e.g., fingerprint and/or iris scanner. These and other input devices can be connected to the processing unit 906 through an input device interface 944 that can be coupled to the system bus 905, but can be connected by other interfaces, such as a parallel port, an IEEE 1394 serial port, a game port, a USB port, an IR interface and/or a BLUETOOTH® interface.

A monitor 946 or other type of display device can be alternatively and/or additionally connected to the system bus 905 via an interface, such as a video adapter 948. In addition to the monitor 946, a computer typically includes other peripheral output devices (not shown), such as speakers and/or printers.

The computer 902 can operate in a networked environment using logical connections via wired and/or wireless communications to one or more remote computers, such as a remote computer 950. The remote computer 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. Additionally, and/or alternatively, the computer 902 can be coupled (e.g., communicatively, electrically, operatively and/or optically) to one or more external systems, sources, and/or devices (e.g., computing devices, communication devices and/or like device) via a data cable (e.g., High-Definition Multimedia Interface (HDMI), recommended standard (RS) 232 and/or Ethernet cable).

In one or more embodiments, a network can comprise one or more wired and/or wireless networks, including, but not limited to, a cellular network, a wide area network (WAN) (e.g., the Internet) or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802. XX wireless technologies and/or legacy telecommunication technologies, BLUETOOTH®, Session Initiation Protocol (SIP), ZIG-BEE®, RF4CE protocol, WirelessHART protocol, 6LoW-PAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver and/or a decoder), software (e.g., a set of threads, a set of processes and/or software in execution) and/or a combination of hardware and/or software that facilitates communicating information among one or more embodiments described herein and external systems, sources, and/or devices (e.g., computing devices and/or communication devices).

The logical connections depicted include wired/wireless connectivity to a local area network (LAN) 954 and/or larger networks, e.g., a wide area network (WAN) 956. LAN and WAN networking environments can be commonplace in offices and companies and can facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired and/or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal and/or external and a wired and/or wireless device, can be connected to the system bus 905 via the input device interface 944. In a networked environment, program modules depicted relative to the computer 902 or portions thereof can be stored in the remote memory/storage device 952. The network connections shown are merely exemplary and one or more other means of establishing a communications link among the computers can be used.

When used in either a LAN or WAN networking environment, the computer 902 can access cloud storage systems or other network-based storage systems in addition to, and/or in place of, external storage devices 916 as described above, such as but not limited to, a network virtual machine providing one or more aspects of storage and/or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, such as with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand and/or store shelf). This can include Wireless Fidelity (Wi-Fi) and BLUETOOTH® wireless technologies. Thus, the communication can be a defined structure as with a conventional network or simply an ad hoc communication between at least two devices.

The illustrated embodiments described herein can be employed relative to distributed computing environments (e.g., cloud computing environments), such as described below with respect to FIG. 10, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1002 described below with reference to illustration 1000 of FIG. 10. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems 100, 200, 300, and/or 400, and/or the example operating environment 900 of FIG. 9, can be associated with and/or be included in cloud-based and/or partially-cloud-based system.

Referring now to details of one or more elements illustrated at FIG. 10, the illustrative cloud computing environment 1002 is depicted. Cloud computing environment 1002 can comprise one or more cloud computing nodes and/or virtual machines with which are used by clients 1004, such as the computer 902. The client 1004 (e.g., client entity) has a processor 1006, network interface card (NIC) 1008, storage 1010 which holds the operating system 1012 and any applications 1014, and RAM 1016 which stores the executing operating system 1018 and applications 1020. The client 1004 is connected to the cloud computing environment 1002 by a network 1003, such as the Internet.

The cloud computing environment 1002 is illustrated as having three servers 1030A, 1030B and 1030C. Each server 1030A-1030C includes three virtual machines 1032, with server 1030A including VMs 1032A-1032C, server 1030B including VMs 1032D-1032E and server 1030C including VMs 1032F-1032G; and a hypervisor 1034A-1034C. More detail is provided of server 1030A as exemplary of the servers 1030B and 1030C. The server 1030A includes a processing unit 1040, a NIC 1042, RAM 1044 and non-transitory storage 1046. The RAM 1044 includes the operating virtual machines 1032A-1032C and the operating hypervisor 1034A. The non-transitory storage 1046 includes stored versions of the host operating system 1050, the virtual machine images 1052 and the stored version of the hypervisor 1054. The servers 1030, 1030B and 1030C are connected by a network in the cloud computing environment 1002 to allow access to the network 1003 and the client 1004.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to conduct aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk or C++, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a defined manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform tasks and/or implement abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based consumer and/or industrial electronics, and/or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface," can refer to and/or can include a computer-related entity or an entity related to an operational machine with one or more specific functionalities. The entities described herein can be either hardware, a combination of hardware and software, software or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random-access memory (RAM) (e.g., ferroelectric RAM (FeRAM). Volatile memory can include RAM, which can function as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has" or "possesses" are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
    a memory that stores computer executable components; and
    a processor that executes the computer executable components stored in the memory, wherein the computer executable components comprise:
        a correlation component that, based on performance data for an application stored at a storage system, correlates a performance category with the application;
        an evaluation component that predicts a type of the application or a use of the application based on the performance category, and
        an execution component that, based on the performance category correlated to the application, and based on the type of the application or the use of the application, executes a modification at the storage system, wherein the modification at the storage system comprises changing a functioning of the storage system relative to the application.

2. The system of claim 1, wherein the data comprised by the application is maintained in a non-accessed state during the execution of the modification at the storage system.

3. The system of claim 1, wherein the modification at the storage system comprises implementation of a policy related to at least one of capacity, performance or usage of the storage system relative to the application.

4. The system of claim 1, wherein the modification at the storage system comprises executing an arrangement of the application or of a data object employed by the application, and wherein the arrangement comprises at least one of duplication of or de-duplication of the application or data object.

5. The system of claim 1, further comprising:
a determination component that determines the performance data comprising current performance data for the application and historical performance data for the application.

6. The system of claim 1, further comprising:
an evaluation component that, based on the performance category correlated to the application, groups into a group or excludes from a group, the application or a data object employed by the application relative to a second application stored at the storage system, wherein the modification at the storage system relative to the application or data object comprises changing the storage system relative to the group.

7. The system of claim 1, further comprising:
a machine learning model that is employed by the correlation component to correlate the performance category with the application, wherein the machine learning model comprises or is comprised by a neural network.

8. The system of claim 7, further comprising:
a training component that trains the machine learning model based on second performance data for the application on which the machine learning model is not yet trained or based on a second application on which the machine learning model is not yet trained.

9. The system of claim 1, further comprising:
a machine learning model that is employed by the evaluation component to predict the type of the application or the use of the application, wherein the machine learning model comprises or is comprised by a neural network.

10. The system of claim 1, wherein data comprised by the application is maintained in a non-accessed state during a determination of the performance data.

11. A computer-implemented method, comprising:
correlating, by a processor, based on performance data resulting from non-intrusive collection of the performance data for an application stored at a storage system, a performance category with the application;
predicting, by the processor, based on the performance category, a type of the application or a use of the application; and
executing, by the processor, based on the performance category and on the type of the application or the use of the application, a directing of a resource at the storage system that alters use of the application by a device accessing the storage system.

12. The computer-implemented method of claim 11, wherein the directing of the resource comprises implementation of a policy related to at least one of capacity, performance or usage of the storage system relative to the application.

13. The computer-implemented method of claim 11, wherein the directing of the resource comprises an arrangement of the application or of a data object employed by the application, and wherein the arrangement comprises at least one of duplication of or de-duplication of the application or data object.

14. The computer-implemented method of claim 11, further comprising:
grouping into a group or excluding from a group, by the processor, based on the performance category correlated to the application, the application or a data object employed by the application relative to a second application stored at the storage system, wherein the modification at the storage system relative to the application comprises changing the storage system relative to the group.

15. The computer-implemented method of claim 11, further comprising:
determining, by the processor, based on second performance data resulting from non-intrusive collection of the second performance data for the application, a revision to the performance data for the application at defined frequency; and
correlating, by the processor, a second performance category with the application based on the revision to the performance data for the application.

16. A computer program product facilitating an automated process to determine and apply a modification to a storage system, the computer program product comprising a computer readable storage medium having program instructions embodied therewith, the program instructions executable by a processor to cause the processor to execute operations, the operations comprising:
grouping, by the processor, based on performance data for an application stored at the storage system, the application or a data object employed by the application in a group with a second application at the storage system, wherein the group is defined by a common performance category of the application and of the second application;
predicting, by the processor, based on the performance category, a type of the application or a use of the application; and
executing, by the processor, based on the common performance category and on the type of the application or the use of the application, the modification at the storage system, wherein the modification at the storage system comprises changing a functioning of the storage system relative to the group.

17. The computer program product of claim 16, wherein the modification at the storage system comprises implementing a policy related to at least one of capacity, performance or usage of the storage system relative to the application.

18. The computer program product of claim 16, wherein the modification at the storage system comprises executing an arrangement of the application or the data object, and wherein the arrangement comprises at least one of duplication of or de-duplication of the application or the data object.

19. The computer program product of claim 16, wherein the operations further comprise:
maintaining, by the processor, non-intrusion of data comprised by the application during execution of the modification at the storage system and during a determination of the performance data.

20. The computer program product of claim 16, wherein the operations further comprise:
determining, by the processor, a revision to the performance data for the application at a defined frequency; and
re-grouping, by the processor, the application or the data object at a second group of the storage system based on a second performance category correlated with the application, wherein the second performance category is based on the revision to the performance data for the application.

* * * * *